United States Patent [19]
Ackeret

[11] Patent Number: 5,507,461
[45] Date of Patent: Apr. 16, 1996

[54] STORAGE DEVICE FOR SPECTACLES, IN PARTICULAR FOR INSTALLATION IN MOTOR VEHICLES

[75] Inventor: Peter Ackeret, Küsnacht, Switzerland

[73] Assignee: fischerwerke, Artur Fischer GmbH & Co. KG, Waldachtal, Germany

[21] Appl. No.: 256,306

[22] PCT Filed: Feb. 15, 1994

[86] PCT No.: PCT/EP94/00431

§ 371 Date: Jun. 29, 1994

§ 102(e) Date: Jun. 29, 1994

[87] PCT Pub. No.: WO94/18032

PCT Pub. Date: Aug. 18, 1994

[30] Foreign Application Priority Data

| Feb. 15, 1993 | [CH] | Switzerland | 00446/93 |
| May 7, 1993 | [CH] | Switzerland | 01403/93 |
| Jun. 18, 1993 | [CH] | Switzerland | 01813/93 |
| Nov. 19, 1993 | [CH] | Switzerland | 03451/93 |

[51] Int. Cl.⁶ ........................... A47G 1/10
[52] U.S. Cl. ............ 248/316.1; 224/312; 248/309.1; 248/902
[58] Field of Search ............ 248/316.1, 316.7, 248/309.1, 309.3, 902; 224/312, 42.45 R

[56] References Cited

U.S. PATENT DOCUMENTS

| 2,884,219 | 4/1959 | Glover . | |
| 4,695,026 | 9/1987 | Medley . | |
| 4,715,575 | 12/1987 | Kamerer . | |
| 4,867,402 | 9/1989 | Benson | 248/309.3 X |
| 4,946,125 | 8/1990 | McCarty | 248/316.7 |
| 5,033,709 | 7/1991 | Yuen | 224/42.45 R |
| 5,137,242 | 8/1992 | Reath | 248/309.1 |
| 5,372,345 | 12/1994 | Schmidt | 224/312 X |

FOREIGN PATENT DOCUMENTS

| 2212118 | 7/1973 | France . | |
| 2351631 | 5/1976 | France . | |
| 2648770 | 7/1989 | France . | |
| 2951942 | 7/1981 | Germany | 248/902 |
| 4122472 | 7/1991 | Germany . | |

*Primary Examiner*—J. Franklin Foss
*Attorney, Agent, or Firm*—Michael J. Striker

[57] ABSTRACT

A spectacle holder, in particular for installation in motor vehicles, comprises a carrier having a bottom wall and a rear wall with spectacle rests, and arranged on the carrier a spectacle support which can be quickly and easily adapted by the user to the size of different types of spectacles by means of an adjusting device.

The spectacles can be removed from and inserted into the spectacle holder and the spectacle side pieces can be opened out and folded up in the spectacles using one hand.

The spectacle holder is in the form of a standardized assembly and can be built into a wide variety of protective housings; it can be moved by means of an extension mechanism from an inner rest position, in which the spectacle holder is enclosed substantially in the protective housing, into an outer rest position, in which the spectacles can be easily removed from the spectacle holder or inserted therein.

73 Claims, 16 Drawing Sheets

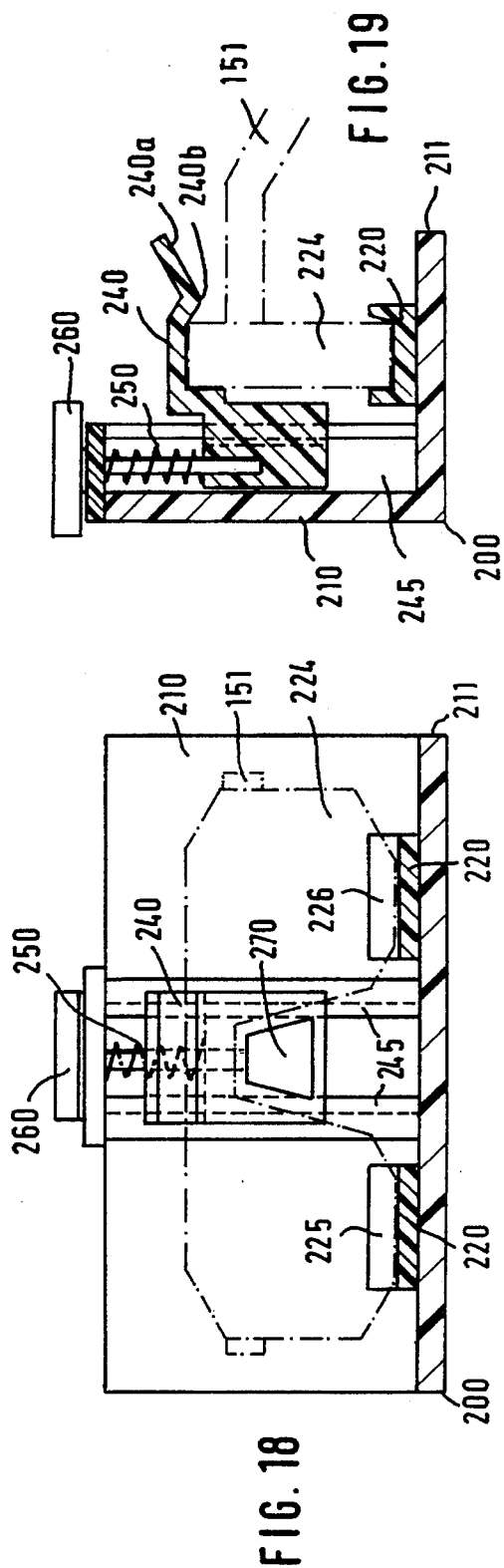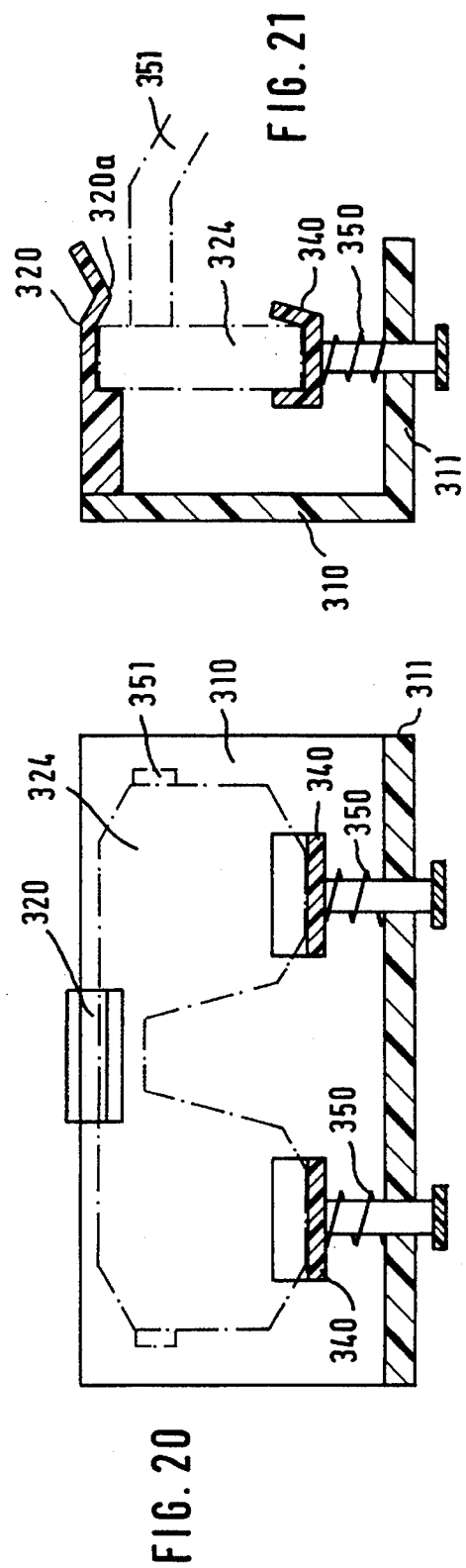

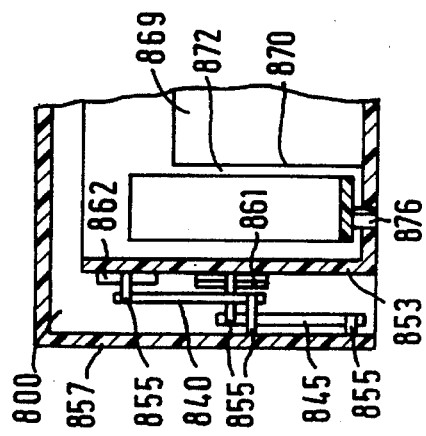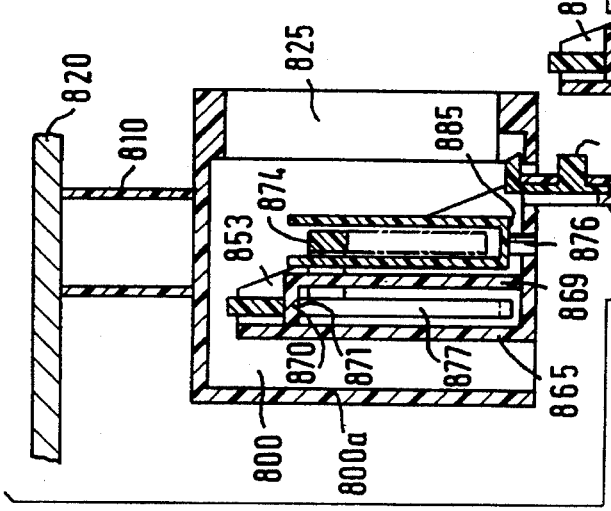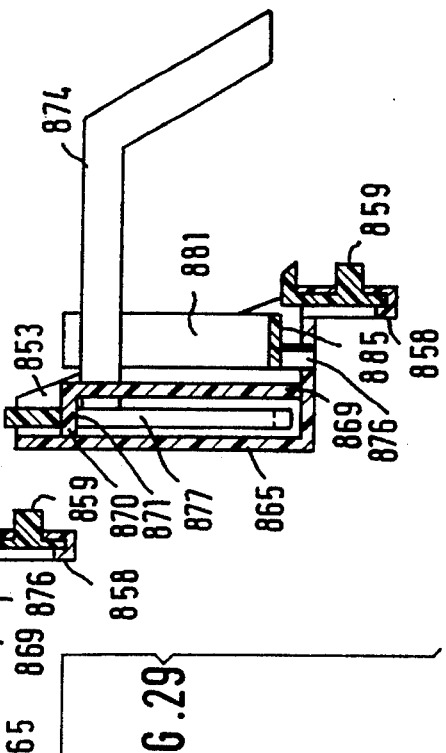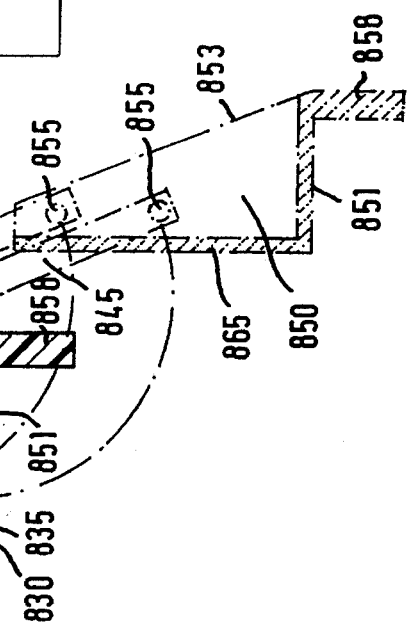

STORAGE DEVICE FOR SPECTACLES, IN PARTICULAR FOR INSTALLATION IN MOTOR VEHICLES

BACKGROUND OF THE INVENTION

The present invention relates to a storage device for spectacles, in particular for installation in motor vehicles.

The use of spectacles and sunglasses in motor vehicles is widespread. Should the light suddenly become blinding, or should it become dark, for example when driving through a tunnel, for the driver in particular a pair of spectacles must be to hand, often instantly, during travel, so that only one hand is needed for them. It is therefore necessary for the spectacles to be stored in the vehicle in such a way that the driver can insert them in the storage device or remove them from it with one hand.

It must also be possible for the side-pieces of the spectacles to be opened out and folded up with one hand without the driver's attention requiring to be diverted from his driving.

On the one hand the spectacles should be capable of being easily and smoothly inserted in and removed from the storage device, and on the other hand the spectacles must be placed and securely held in the storage device well enough so that even stiff side-pieces can be opened out and folded up, without the spectacles being torn out of the storage device or twisted as this action is being performed.

In the stored state, the spectacles should be protected against dust, dirt and scratching. Screening against the sun's rays is also desirable. So that operation by the driver is possible during travel, the device must, on the one hand, be arranged to be mounted in the vehicle and to be operated in such a manner that the driver does not need to avert his gaze from the road. On the other hand, the device must not obstruct the driver's view. The use of the device in countless different vehicle models further requires it to be of a type suitable for installation in as wide a variety of vehicles as possible, requiring only minimal and inexpensive adaptations to the individual vehicle models.

There are many forms of spectacles available commercially. Shape, depth, width and thickness and also the nose space and the arrangement of the side-pieces vary within a wide range. There are also innumerable styles of spectacles of very delicate construction which are easily deformable when pressure is applied.

Spectacle holders for retrospective mounting in vehicles are commercially available. These are generally adhesively secured to the dashboard covering and the spectacles are placed in the pocket-type holder. The spectacles are then not only exposed to dirt, dust and the effects of the sun's rays, they also, depending on their positioning, partially obstruct the driver's view. In addition, such stuck-on holders pose a significant risk of injury in the event of road accidents. These spectacle holders are designed for a specific category of spectacle sizes and shapes, so that spectacles of relatively large format cannot be stored in those holders at all, whilst spectacles of smaller dimensions are not securely held and are thus easily able to fall out of the holder or be torn out of the holder when opening and closing the spectacle side-pieces.

SUMMARY OF THE INVENTION

It is the aim of the invention to provide a holder for keeping and storing different styles of spectacles, especially for installation in motor vehicles, in which the spectacles are protected and in which they can be placed and from which they can be removed with one hand.

The spectacle holder according to the invention consists of a carrier comprising a bottom wall and a rear wall with spectacle rests, and also, arranged on the carrier, a spectacle support, which the user is quickly and easily able to adapt to the sizes of different styles of spectacles by means of an adjusting device. The spectacles can be removed from and placed in the spectacle holder using one hand and the spectacle side-pieces can be opened out and folded up in the spectacles. The spectacle holder is consequently especially suitable for installation in motor vehicles, since for safety reasons it is necessary to remove and insert a pair of spectacles using only one hand.

The spectacle holder is constructed as a standardised assembly and can be installed in different kinds of protective housing, and can be moved by means of an extension mechanism from an inner rest position, in which the spectacle holder is substantially enclosed in the protective housing, into an outer rest position, in which the spectacles can easily be removed from or placed in the spectacle holder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 18 and 19 show in a diagrammatic front view and in cross-section, respectively, a further embodiment of the spectacle holder.

FIGS. 20 and 21 show in a diagrammatic front view and in cross-section, respectively, a further embodiment of the spectacle holder.

FIG. 28 is a diagrammatic view in cross-section of a further embodiment of a protective housing arranged on an interior rear-view mirror, with the spectacle holder in the inner and outer rest positions.

FIG. 29 is a diagrammatic view in cross-section of the embodiment according to FIG. 28, with a device for opening and closing the side-pieces of a pair of spectacles inserted in the spectacle holder in the inner and outer positions.

FIG. 30 is a diagrammatic fragmentary front view of the device according to FIG. 29 without a pair of spectacles.

DESCRIPTION OF PREFERRED EMBODIMENTS

Figure 1:
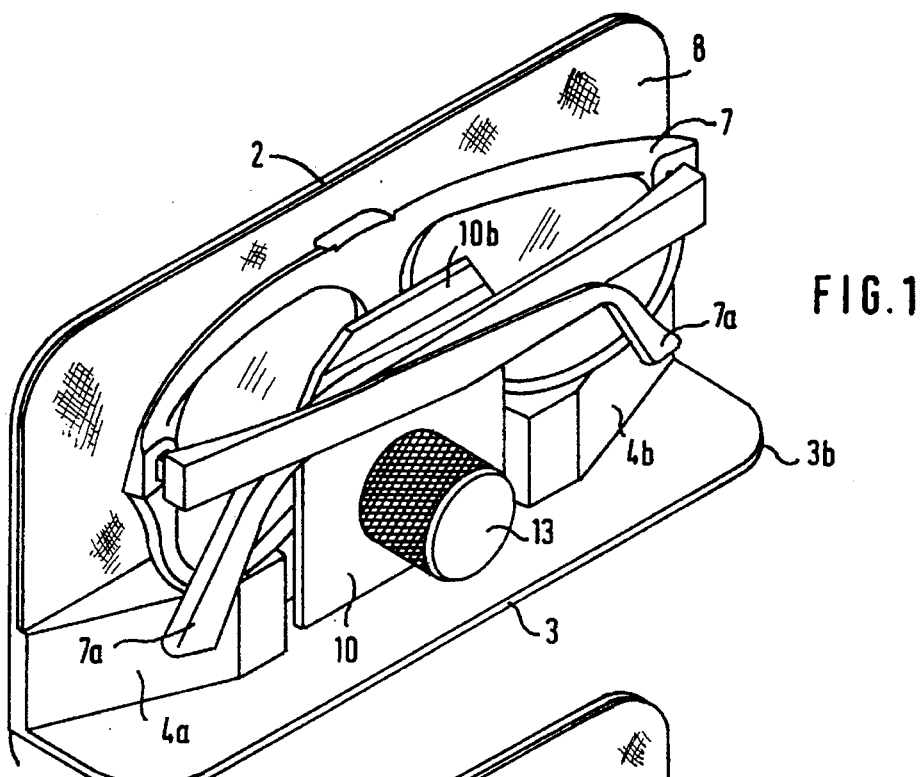
FIG. 1 is a perspective view of a first embodiment of the spectacle holder with a pair of spectacles inserted.
Figure 2:
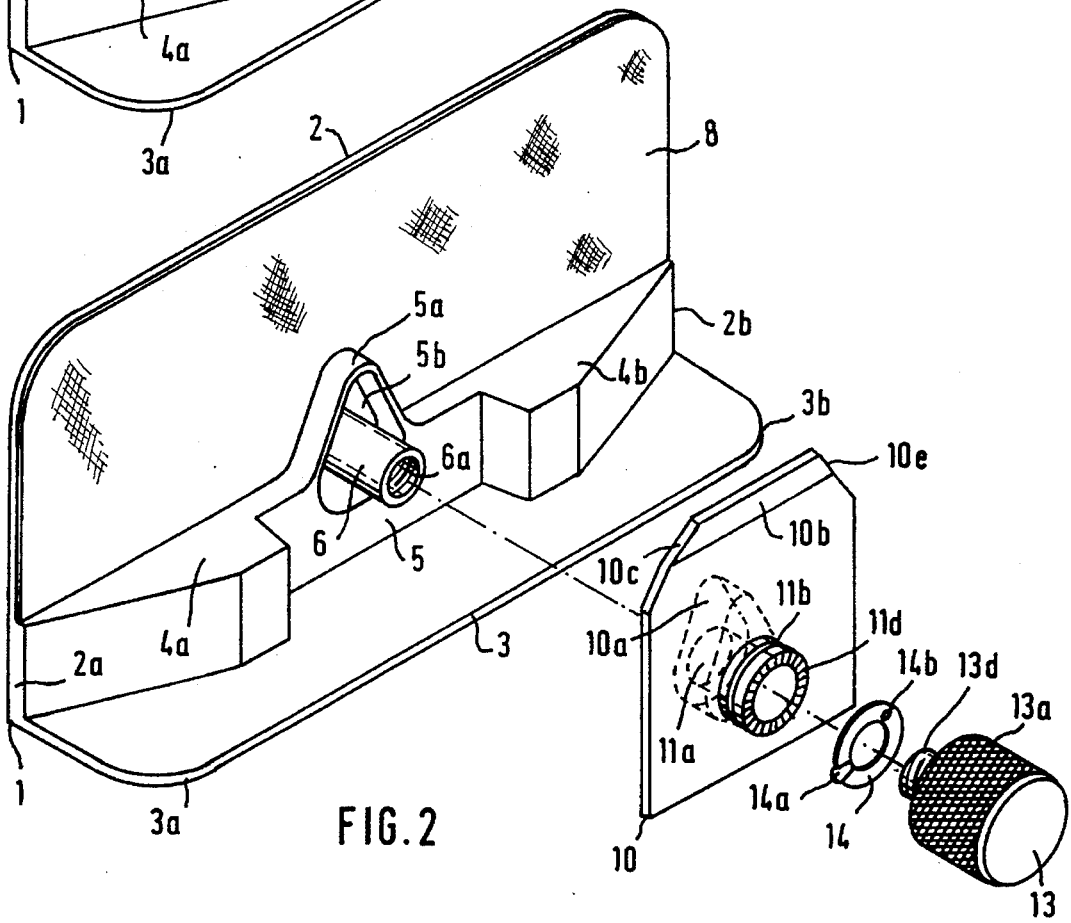
FIG. 2 is a perspective view of the individual parts of the dismantled spectacle holder according to FIG. 1.
Figure 3:
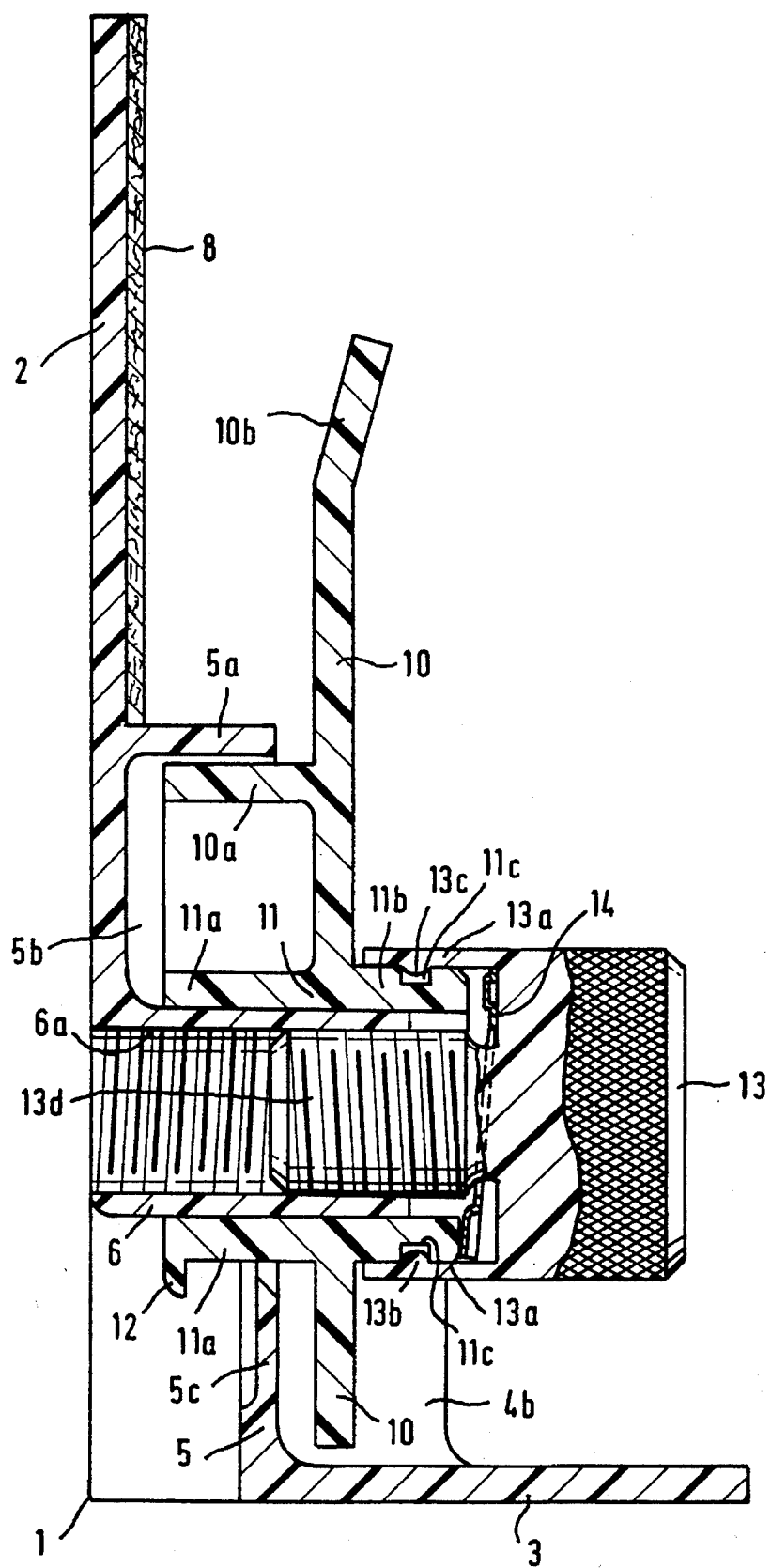
FIG. 3 shows a cross-section through the spectacle holder according to FIGS. 1 and 2 without a pair of spectacles.
Figure 4:
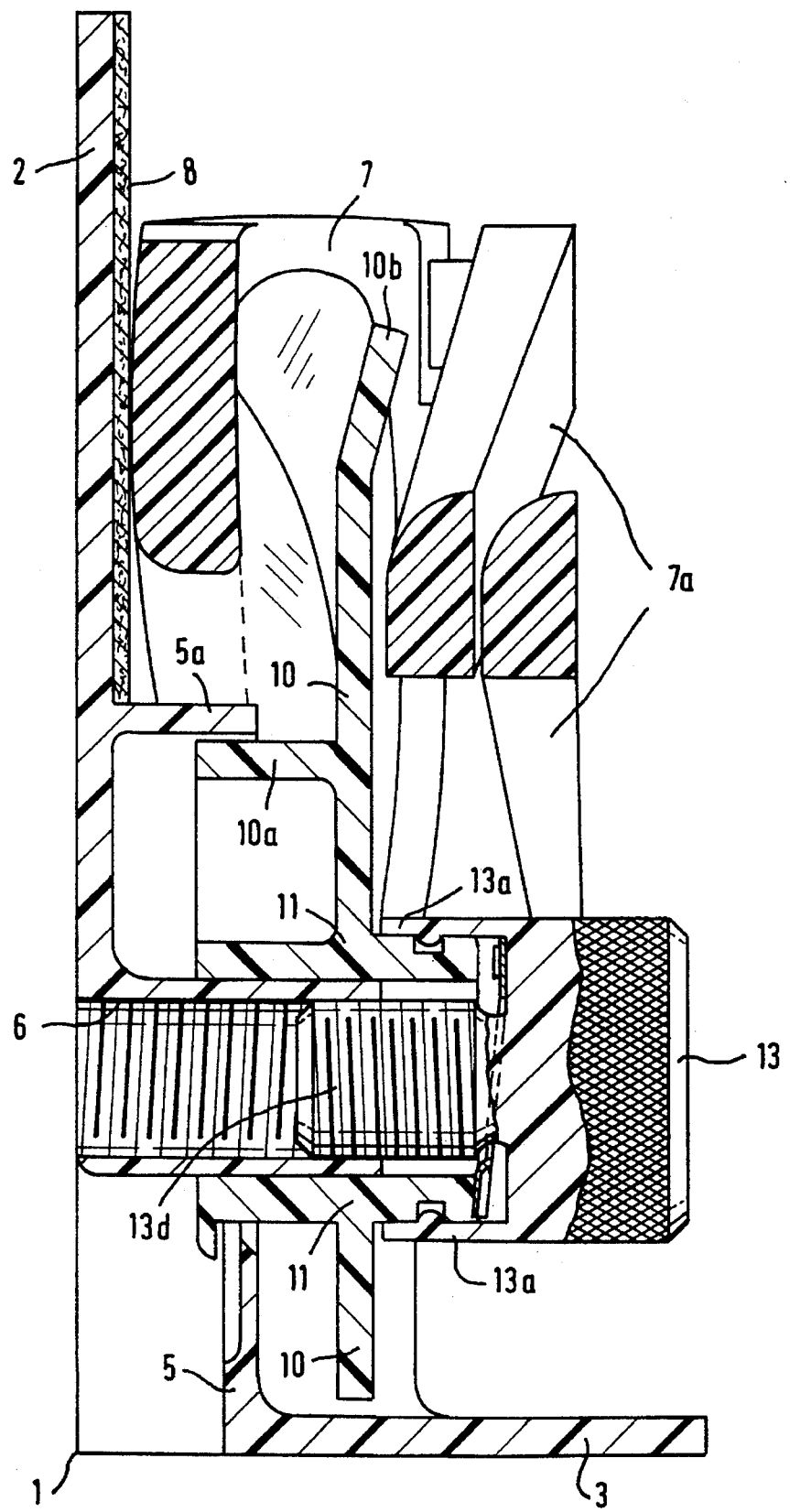
FIG. 4 shows a cross-section through the spectacle holder according to FIG. 3 with a pair of spectacles inserted.

FIGS. 1 to 4 show a first embodiment of the spectacle holder in different views with and without a pair of spectacles.

The carrier 1 has a substantially L-shaped cross-section which is formed by the rear wall 2 and the bottom wall 3 which are joined to one another by the box-like spectacle rests 4a, 4b.

The spectacle rests 4a, 4b are joined to one another in the middle region of the carrier 1 by way of a joining section 5 set back towards the rear wall 2, and taper towards the outer end edges 2a, 2b of the rear wall 2.

In its middle region the joining section 5 has an upwardly directed nose-shaped arch 5a. In the hollow space 5b of the arch 5a there is arranged a cylindrical threaded sleeve 6 which is joined to the rear wall 2 of the holder 1 and is provided with an internal thread 6a.

In the region above the spectacle rests 4a, 4b and also the arch 5a and the joining section 5, the rear wall 2 is covered on its inner surface with a covering 8 (for example a felt material) protecting the spectacles 7 against scratching.

The bottom wall 3 projects beyond the spectacle rests 4a, 4b and is rounded at its corners 3a, 3b.

The carrier 1 is advantageously manufactured as a one-piece injection-moulded part from thermoplastics material, and the spectacle rests 4a, 4b and the joining section 5 can then be formed by recessing from below and/or from behind so that manufacture with simple injection-moulding tools is possible.

The pressure plate 10 is mounted on the carrier 1 so as to be displaceable parallel to the rear wall 2 of the carrier 1 by way of the guide sleeve 11, which is guided telescopically on the threaded sleeve 6.

Formed on the pressure plate 10 there is a projection 10a which is complementary to the arch 5a and is guided in this; the projection prevents rotation of the pressure plate 10 relative to the carrier 1.

The lengths of the guide portion 11a, of the guide sleeve 11 projecting towards the rear wall 2 of the carrier 1 and of the projection 10a and the arch 5a are dimensioned so that on the one hand, even when the rear wall 2 and the pressure plate are in the fully open position, no opening is able to form between the pressure plate 10 and arch 5a in which a pair of spectacles 7 inserted in the holder could become jammed as the pressure plate 10 is displaced towards the rear wall 2, and so that on the other hand the pressure plate 10 can be displaced so closely towards the rear wall 2 that even a pair of spectacles 7 of minimum thickness can be reliably clamped between the rear wall 2 and the pressure plate 10.

The guide sleeve 11 is extended by an extension 11b projecting backwards beyond the pressure plate 10, so that the pressure plate 10 is safeguarded as reliably as possible against tilting and the guidance between the threaded sleeve 6 and the guide sleeve 11 is safeguarded against jamming.

The width of the pressure plate 10 is such that it can be displaced between the spectacle rests 4a, 4b parallel to the rear wall 2.

At its top end 10b, the pressure plate 10 is angled backwards and is provided laterally with sloping sections 10c, 10e to facilitate introduction and removal of the spectacles 7.

The pressure plate 10 is preferably made of a resilient material which is able to adapt as well as possible to the contours of an inserted pair of spectacles 7 and is capable of pressing these against the rear wall 2 with a light clamping action.

At the end of the guide portion 11a there is a stop projection 12 which limits the maximum opening travel of the pressure plate 10 as it runs against the end wall 5c of the joining section 5.

Together with the projection 10a, the arch 5a forms a centring means which projects into the nose space of an inserted pair of spectacles 7 and centres these laterally. The pressure plate 10 is preferably manufactured together with the guide sleeve 11 and the projection 10a as a one-piece injection-moulded plastics part.

Behind the guide extension 11b there is arranged an adjusting screw 13 which is provided with a cylindrical covering, overlaps the guide extension 11b and has inwardly directed driver projections 13b, 13c which, as the adjusting screw 13 is mounted, snap into a groove-shaped recess 11c of the guide extension 11b by virtue of the resilient deformation of the cover 13a, so that the adjusting screw 13 is rotatably joined to the pressure plate 10.

The shank 13d of the adjusting screw 13 is provided with an external thread which is screwed into the internal thread 6a of the threaded sleeve 6.

Between the inside of the adjusting screw 13 and the guide extension 11b there is a spring ring 14 which is secured against rotation with respect to the adjusting screw 13 by means of a stop 14a and has a resilient projection 14b which snaps into a ribbing 11d arranged on the end face of the guide extension 11b and thus fixes a setting of the adjusting screw 13.

By turning the adjusting screw 13, the user is able to adjust the distance between the rear wall 2 and the pressure plate 10 and match it by means of continuous adjustment to the thickness of an inserted pair of spectacles 7 until the pressure plate 10 is deformed slightly and the spectacles 7 are consequently clamped between the rear wall 2 and the pressure plate 10.

The resilience of the pressure plate 10 ensures that the spectacles 7 are not damaged as the pressure screw 13 is screwed in, in that the pressure on the spectacles is cushioned and thus increases slowly.

Because of the relatively restricted spring travel of the pressure plate 10, the spectacles are supported in such a way that even stiff side-pieces 7a of a pair of spectacles 7 inserted in the spectacle holder can be opened out behind the pressure plate 10 without the pressure plate 10 yielding backwards and without the possibility of the spectacles 7 being torn out of the holder.

Easy insertion and removal of the spectacles 7 from between the rear wall 2 and the pressure plate 10 is nevertheless guaranteed.

The spectacles 7 are then clamped between the rear wall 2 and the pressure plate 10 so securely that even when rotating or turning the spectacle holder (for example when folding it away into a protective housing) the spectacles are unable to fall out of the spectacle holder nor cause vibration noises.

The taper of the spectacle rests 4a, 4b towards the outer end edges 2a, 2b provides the necessary space for the folded-up spectacle side-pieces 7a, the bottom wall 3 serving as protection for the folded-up side-pieces 7a so that as the spectacle holder is swivelled into a protective housing they are unable to catch against it.

The adjusting screw 13 is positioned in such a way that it lies beneath the spectacle side-pieces 7a of a pair of spectacles 7 inserted in the spectacle holder, so that on the one hand the spectacle side-pieces 7a can be folded up completely and so that on the other hand even with the side-pieces folded up the adjusting screw 13 still remains accessible for adjustment of the pressure plate 10.

The adjustment option provided means that a user is able to adapt the spectacle holder quickly and easily from an operating side to spectacles of a wide variety of shapes and sizes, each pair of spectacles being retained in the spectacle holder in such a way that even when their side-pieces are stiff they can still be opened out and folded up using one hand without the spectacles being able to tip out of the spectacle holder.

Despite that, the spectacles can still be removed from the spectacle holder or inserted therein using one hand and with minimum expenditure of force; these operations can be performed with the side-pieces either opened out or folded up, with the result that the user is guaranteed the greatest possible convenience of operation with minimum distraction.

The spectacle holder is conceived as a standardized assembly with just four components which can be installed without additional adaptations into a wide variety of protective housings.

It is obvious that alternative adjusting means or adjusting means increasing convenience of use can be used to adjust the distance between the rear wall 2 and the pressure plate 10.

Figure 5:
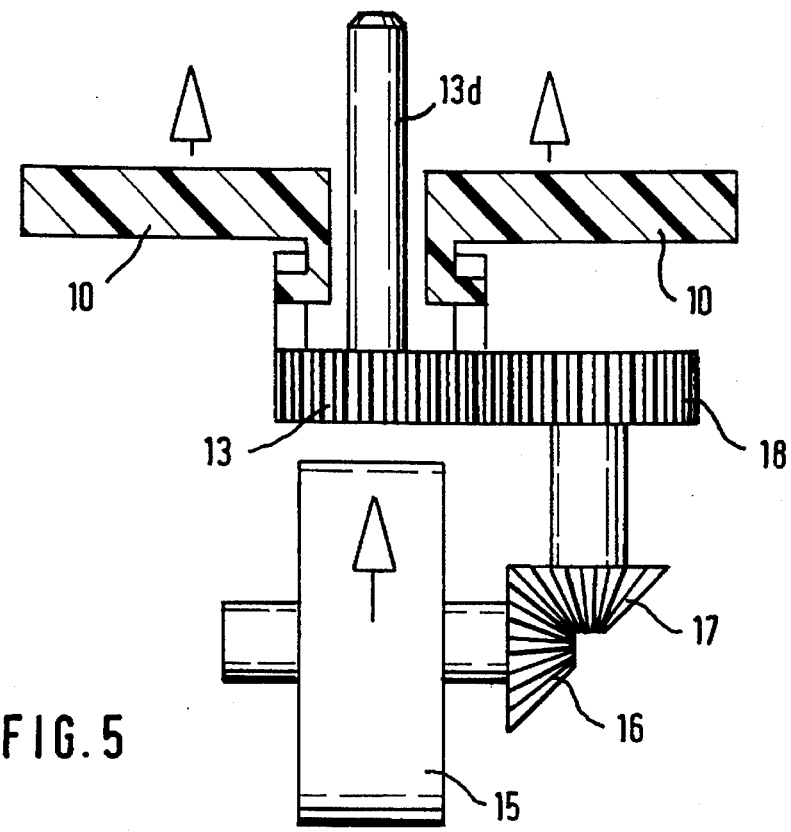
FIG. 5 is a diagrammatic view of a detail construction of a variation of the adjusting mechanism for the pressure plate.

Thus, FIG. 5, for example, illustrates an embodiment in which the adjusting screw 13 can be adjusted by means of an adjusting wheel 15 mounted transversely to its shaft 13d; the rotation of the adjusting wheel 15 is transmitted by way of two bevel wheels 16, 17 and an intermediate wheel 18 to the adjusting screw 13. By matching the resultant directions of movement of adjusting wheel 15 and pressure plate 10, the orientation can be made more convenient for the user.

Figure 6:
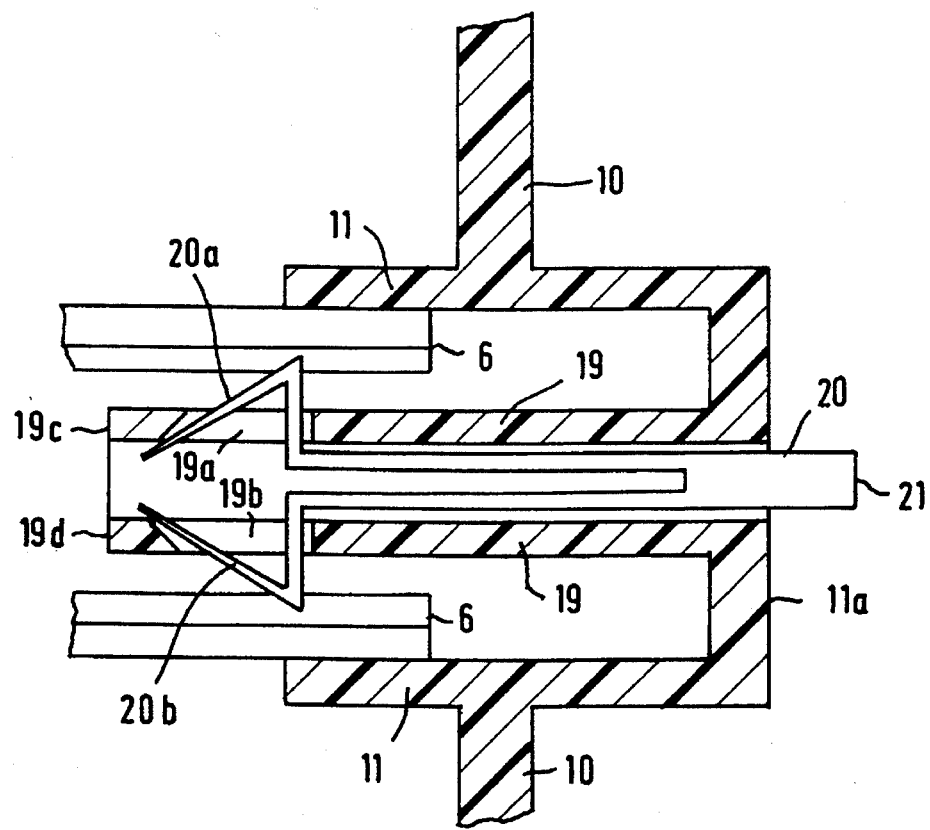
FIG. 6 is a diagrammatic view of a detail construction of a further variant of the adjusting mechanism for the pressure plate.

FIG. 6 illustrates a further alternative possibility for adjusting the distance between the rear wall 2 and the pressure plate 10.

Instead of an adjusting screw 15[1], in this embodiment a push-button mechanism is used for a continuous adjustment of the pressure plate 10.

[1] Presumably in error for "adjusting screw 13"—translator.

The guide sleeve 11 has an internal sleeve 19 in which an expanding pin 20 is longitudinally displaceable. The internal sleeve 19 has openings 19a, 19b through which the locking projections 20a, 20b arranged resiliently on the expanding pin 20 pass and lock the guide sleeve 11 in a specific position in the threaded sleeve 6. By pressure on the push button 21 emerging from the guide sleeve 11 at the rear end face 11a thereof, the locking projections 20a, 20b are pressed inwards against their spring bias by running onto the control portions 19c, 19d of the internal sleeve 19, with the result that the guide sleeve 11 is unlocked and the pressure plate 10 can be continuously adjusted.

Figure 7:
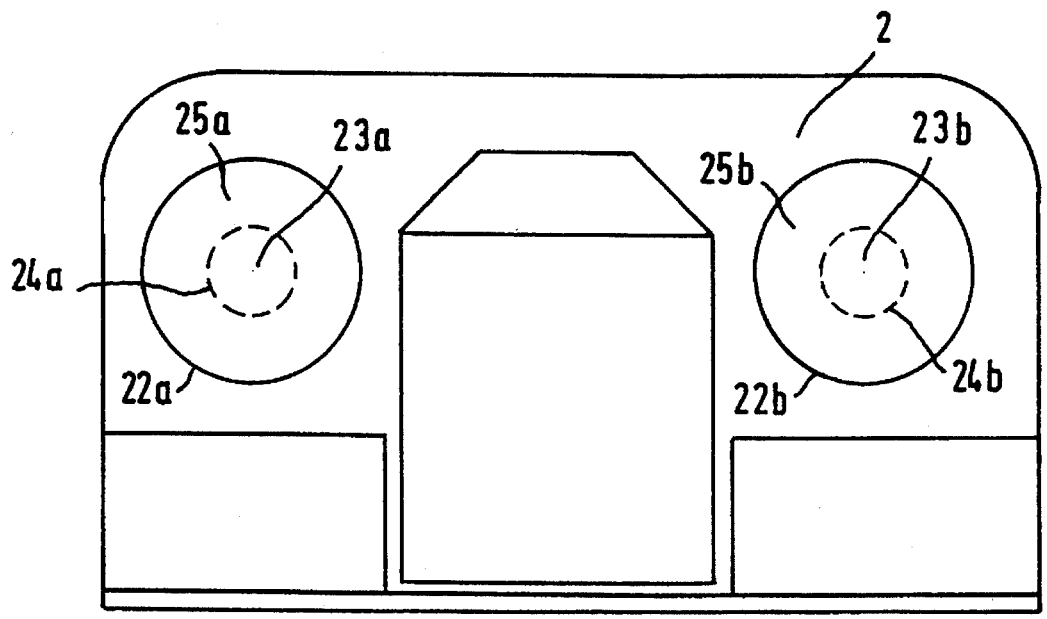
FIG. 7 is a front view of a variant of the spectacle holder with two inserted separate components.
Figure 8:
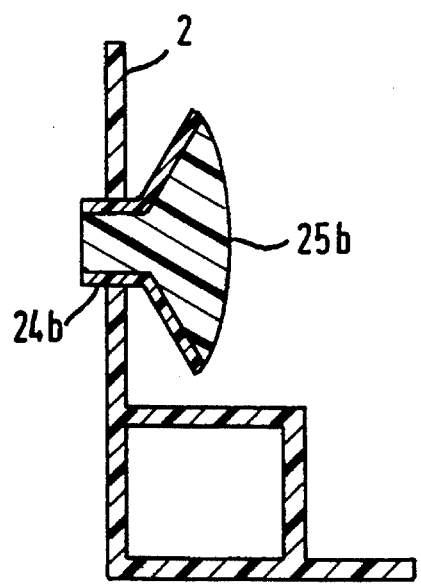
FIG. 8 shows the spectacle holder according to FIG. 7 in cross-section.
Figure 9:
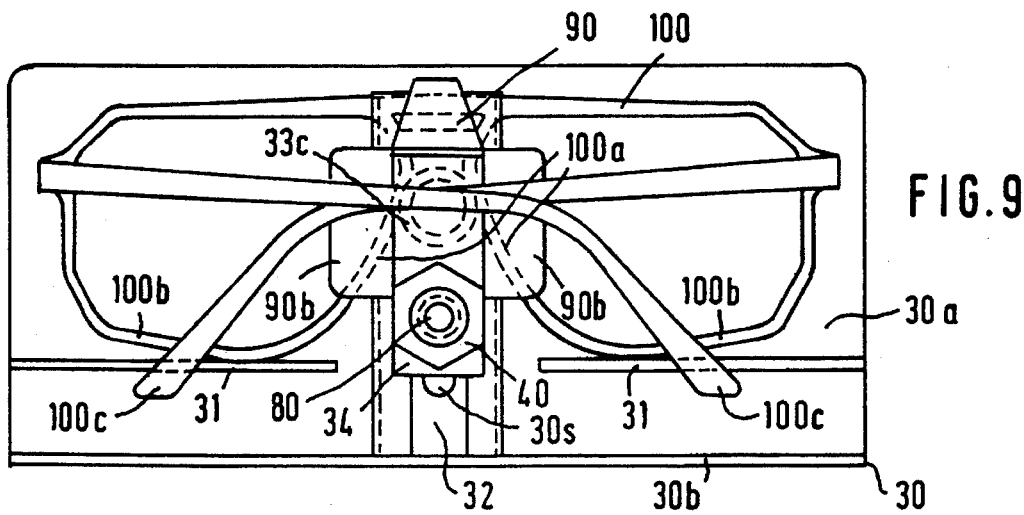
FIG. 9 is a front view of a second embodiment of the spectacle holder with a pair of spectacles inserted.
Figure 10:
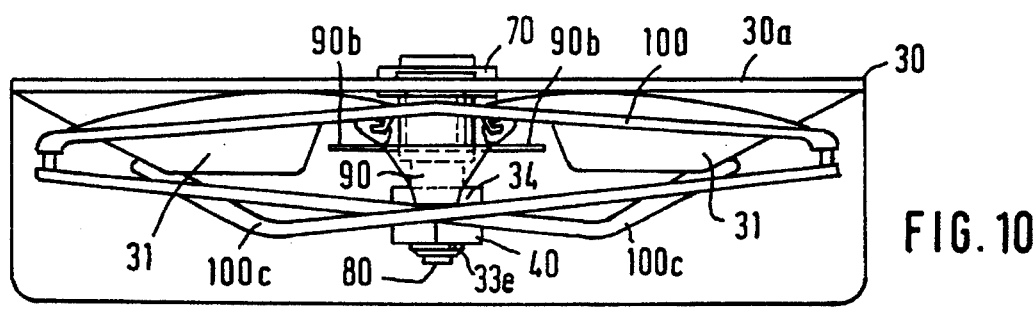
FIG. 10 is a plan view of the spectacle holder according to FIG. 9 with a pair of spectacles inserted.
Figure 11:
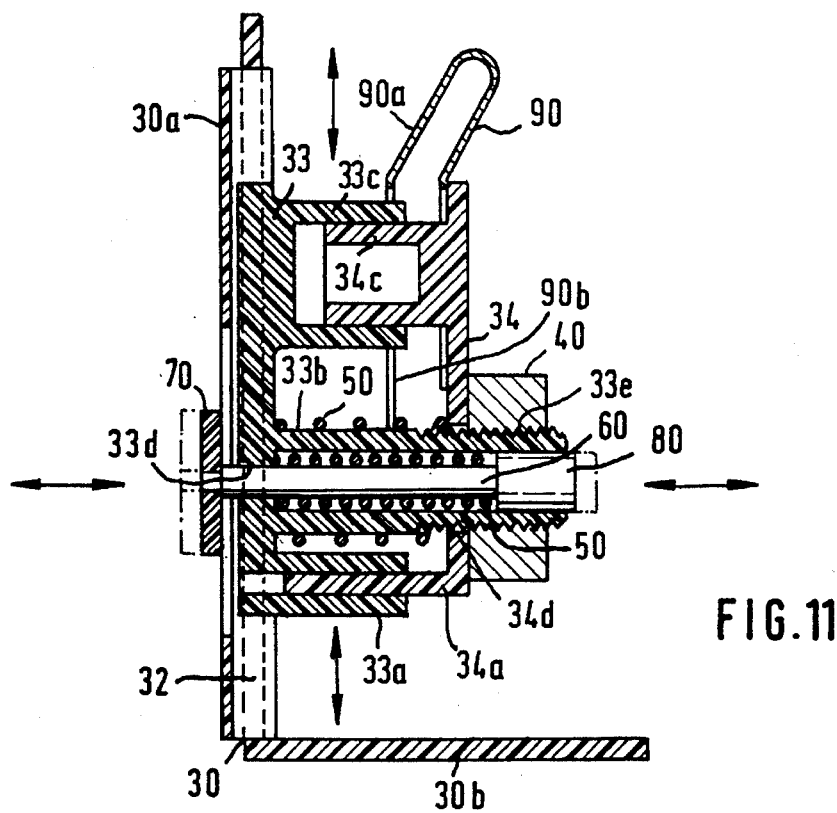
FIG. 11 shows the spectacle holder according to FIGS. 9 and 10 in cross-section.
Figure 12:
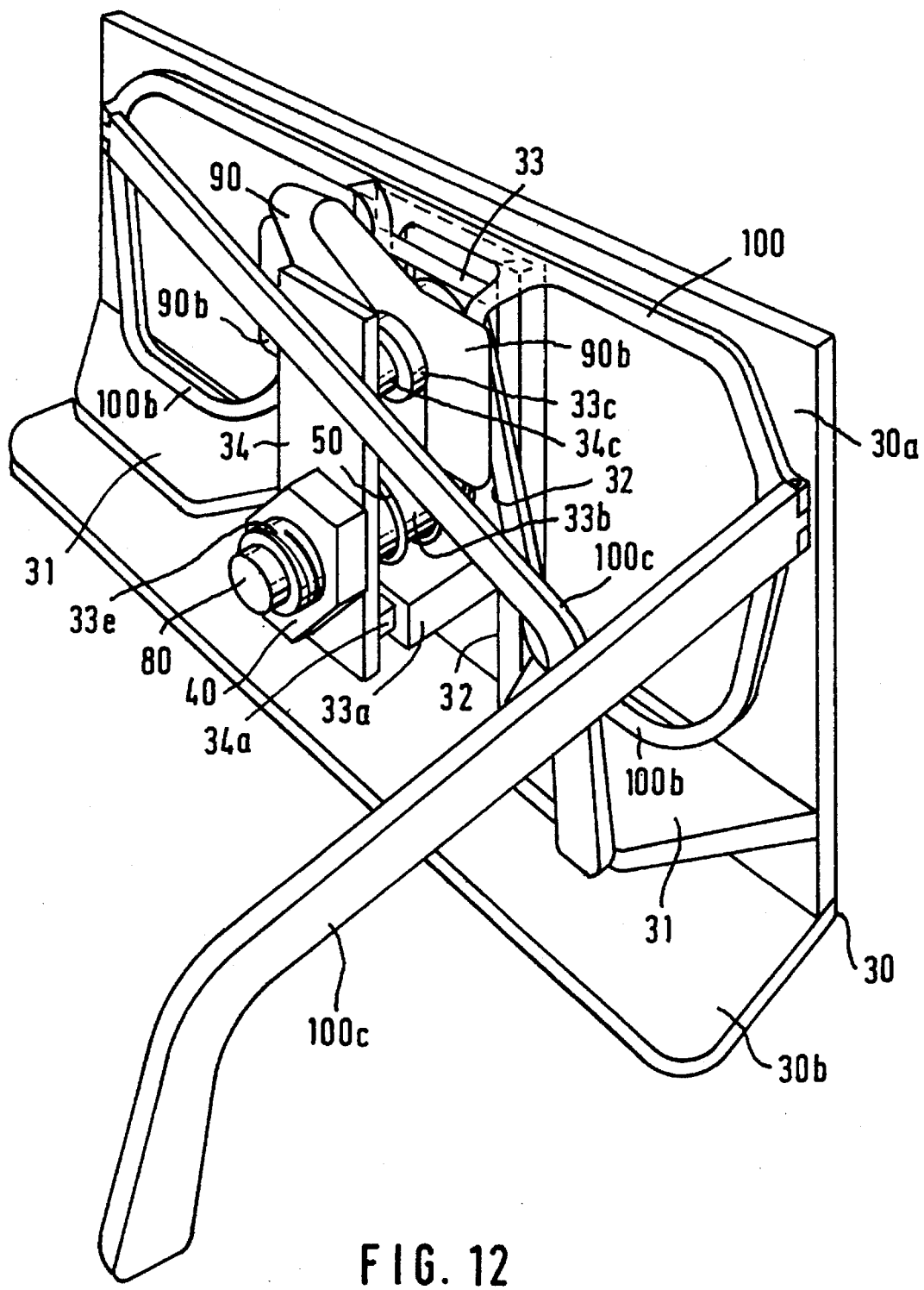
FIG. 12 is a perspective view of the spectacle holder according to FIGS. 9 to 11 with a pair of spectacles inserted.

FIGS. 7 and 8 show a special construction of the spectacle holder with two separate components 22a, 22b which on the one hand can be inserted in the rear wall 2 and thus protect the lenses of a pair of spectacles inserted in the spectacle holder against damage and scratching, and on the other hand can be removed from the rear wall 2 and detached from the spectacle holder for cleaning the spectacle lenses.

Two round openings 23a, 23b are provided in the rear wall 2 in which the shanks 24a, 24b of the components 22a, 22b can be inserted. The end faces of the shanks 24a, 24b directed towards the spectacles have mushroom-shaped caps 25a, 25b which are preferably covered with a soft textile covering. The depth of insertion of the shanks 24a, 24b into the rear wall 2 is such that the caps 25a, 25b can still be comfortably gripped for removal of the components 22a, 22b.

A further embodiment of the spectacle holder is illustrated in FIGS. 9 to 12.

Spectacle rests 31 are arranged on the rear wall 30a of the carrier 30 symmetrically with respect to the centre line thereof and so that they protrude perpendicularly therefrom.

Between the spectacle rests 31 there is a guide channel 32, extending substantially for the height of the rear wall 30a, in which the slider 33 is slideably mounted.

The pressure plate 34, which runs parallel to the rear wall 30a, is mounted in the slider 33 so that it can be displaced parallel by way of the centring element 33c, which guides the pin 34c, and the telescopic guide means 33a, 34a.

The slider 33 additionally has in its lower region a sleeve 33b which extends backwards between and parallel to the centering element 33c and the telescopic guide means 33a of the slider 33.

The pressure plate 34 has a hole 34d through which the sleeve 33b extends.

At its rear end the sleeve 33b is provided with an external thread 33e onto which an adjusting nut 40 is screwed behind the pressure plate 34.

A pressure spring 50 guided by the sleeve 33b is clamped between the rear wall 30a and the pressure plate 34, and presses the pressure plate 34 against the adjusting nut 40. By turning the adjusting nut 40, the distance between the rear wall 30a and the pressure plate 34 can be continuously adjusted.

The pin 60 which projects through a hole 33d in the slider 33 and through the slot 30s arranged parallel to the guide channel 32 in the rear wall 30a is mounted in the sleeve 33b.

Behind the rear wall 30a, the friction plate 70 is arranged at the end of the pin 60. The push-button 80, by means of which the pin 60 can be pressed inwards manually against the force of the spring 50 arranged in the sleeve 33b, is arranged at the other end of the pin 60.

When that is done, the friction plate 70 is released, and when the push-button 80 is not being operated the friction plate fixes the slider 33 by means of friction to the rear wall 30a, so that the height of the slider 33 can be continuously adjusted in the guide channel 32.

At the top end of the pressure plate 34 there is a backwardly inclined U-shaped leaf spring 90.

Arranged on the free arm 90a of the leaf spring 90 are the two spring plates 90b, which project laterally with respect to the centring element 33c and the sleeve 33b between and parallel to the rear wall 30a and the pressure plate 34.

At its lower end, the rear wall 30a has a base plate 30b positioned perpendicularly thereto, which extends beyond the depth of the spectacle rests 31.

The spectacles 100 are placed into the spectacle holder from above between the rear wall 30a and the spring plates 90b[2].

[2] Presumably in error for 90b—translator.

The centering element 33c engages in the nose space 100a of the spectacles 100.

When the push button 80 has been operated, the slider 33 can be vertically displaced until on the one hand the centring element 33c touches the upper limitation of the nose space 100a and thus centres the spectacles laterally, and on the other hand the lower edges 100b of the spectacles 100 rest on the spectacle rests 31 and thus secure the spectacles 100 against tipping sideways.

By turning the adjusting nut 80, the pressure plate 34, and with it the two spring plates 90b, can be matched to the thickness of the spectacles 100 so that these are unable to tip backwards as the side-pieces 100c are opened out.

On the one hand the spring plates 90b ensure that the spectacles 100 cannot be damaged as the adjusting nut 40 is turned, and on the other hand, even when the spectacles fit snugly, they ensure that no great pressure is required to remove the spectacles from the spectacle holder and insert them therein.

Additionally, this also ensures that the spectacles 100 are unable to fall out of the spectacle holder even when the spectacle holder is turned over or rotated (for example, when being folded into a protective housing).

Furthermore, the spectacles 100 are safeguarded by the spring plate 90b against vibrations and scratching; it is here advisable for the regions of the rear wall 30a that come into contact with the spectacles, in particular with the lenses thereof, to be provided with a protective covering.

On either side of the pressure plate 34 and the spring plate 90b there are empty spaces, through which the spectacle side-pieces 100c project behind the pressure plate 34 and can there be opened out or folded up, without the spectacles 100 having to be gripped by hand.

The bottom wall 30b serves as lower limitation and protection for the folded up side-pieces 100c, so that as the spectacle holder is swivelled into a protective housing they are unable to catch against it.

The adjustment options provided mean that a user is able to adapt the spectacle holder quickly and easily from an operating side to spectacles of a wide variety of shapes and sizes, each pair of spectacles being retained in the spectacle holder in such a way that even when their side-pieces are stiff they can still be opened out and folded up using one hand without the spectacles being able to tip out of the spectacle holder.

Despite that, the spectacles can still be removed from the spectacle holder or inserted therein using one hand and with minimum expenditure of force.

The spectacle holder is conceived as a standardized assembly which can be built into different protective housings depending on applications and spatial circumstances.

Figure 13:
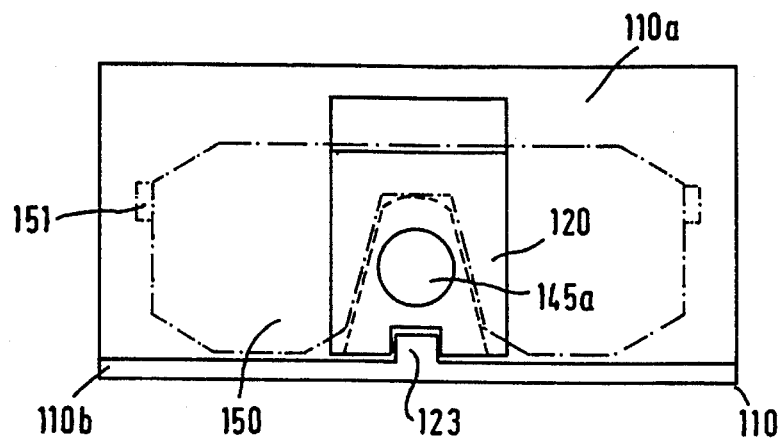
FIGS. 13 to 15 show in diagrammatic front view and in cross-section further embodiments of pressure plates of the spectacle holder.
Figure 14:
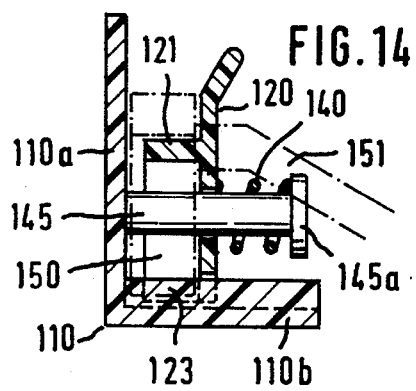
Figure 15:
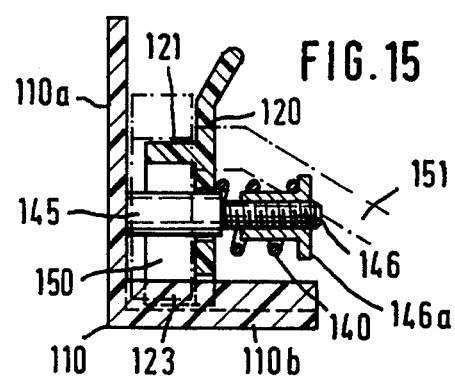

FIGS. 13 to 15 show further embodiments of pressure plates.

The carrier 110 has an L-shaped cross-section with a rear wall 110a and a bottom wall 110b. Arranged in the middle of the carrier 110 is the pressure plate 120 which runs parallel to the rear wall 110a. On the pressure plate 120 there is a centering projection 121 directed towards the rear wall 110a, the contours of which centering projection are set back with respect to the pressure plate 120. The pressure plate 120 is displaceably mounted in a channelled guide means 123 in the bottom wall 110b.

In the embodiment shown in FIG. 14, the pressure plate 120 is pressed against the rear wall 110a by a compression spring 140, which is mounted on a pin 145 arranged on the rear wall 110a and bears against the end cap 145a.

The spectacles 150 are inserted between the rear wall 110a and the pressure plate 120. The centring projection 121 engages the nose space of the spectacles 150 which are thus laterally centred. The pressure plate 120 is pressed by the compression spring 140 against the spectacles 150 which are thus securely held in the spectacle holder. The side-pieces 151 of the spectacles can be opened out and folded up behind the pressure plate 120. As the spectacles 150 are removed, they are drawn parallel to the pressure plate 120 upwards out of the spectacle holder. It is obvious that the force of the compression spring 140 must be so selected that on the one hand insertion in or removal of the spectacles from the spectacle holder is effortless, yet on the other hand the pressure plate cannot be pressed so hard as the side pieces of a pair of spectacles inserted in the holder are being opened out or folded up that the spectacles are torn out of the holder.

FIG. 15 shows a pressure-applying arrangement for the pressure plate 120 analogous to that of FIGS. 13 and 14, in which the end cap 146a is arranged on a screw 146 mounted adjustably in the pin 145. By turning the screw 146, the maximum opening between the rear wall 110a and the pressure plate 120, and also the clamping force of the compression spring 140, can be continuously adjusted and thus matched in an optimum manner to the thickness of the spectacles.

Figure 16:
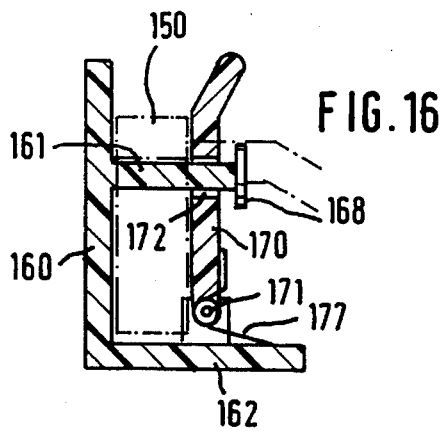
FIGS. 16 and 17 are diagrammatic cross-sections of further constructions of pressure plates of the spectacle holder.
Figure 17:
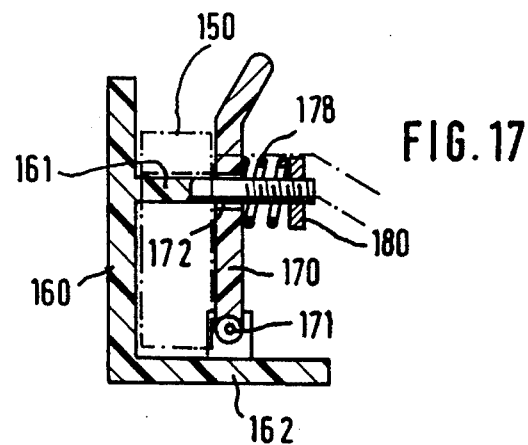

FIGS. 16 and 17 show alternative embodiments of pressure plates which are rotatably hinge-mounted on the carrier.

The centring projection 161 is arranged on the rear wall 160. The pressure plate 170 is rotatably mounted on the bottom wall 162 by way of a hinge 171. An opening 172 through which the centring projection 161 extends is provided on the pressure plate 170.

In FIG. 16, the pressure plate 170 is pressed by the torsion spring 177 arranged in the region of the hinge 171 against the rear wall 160. A stop member 168 limits the maximum opening travel of the pressure plate 170.

In the embodiment illustrated in FIG. 17, a compression spring 178 arranged behind the pressure plate 170 biases the pressure plate 170 towards the rear wall 160. By means of an adjusting screw 180, which is displaceably mounted on the centring projection 161, the maximum opening between the rear wall 160 and the pressure plate 170 and also the clamping force of the compression spring 178 can be continuously adjusted and thus matched in an optimum manner to the thickness of the spectacles.

A further embodiment of a spectacle holder in which the spectacles can be inserted or removed directly from the front is illustrated in FIGS. 18 and 19.

The carrier 200 has an L-shaped cross-section with a rear wall 210 and a bottom wall 211. On the bottom wall 211 there are arranged two U-shaped supports 220, into which the lower edge parts 225, 226 of the spectacles 224 are placed.

The clip 240 is arranged in the middle of the spectacle holder and is vertically displaceable against the force of the spring 250 in a guide 245 on the rear wall 210.

Once the spectacles 224 have been placed in the supports 220, the spectacles can be pivoted, with the supports 220 as the "pivot point", towards the guide member 240a of the clip 240. The clip 240 is able to yield upwards against the force of the spring 250 until the projection 240b snaps in behind the spectacles 224 and locks these in the spectacle holder. For removal, the spectacles 224 can easily be tilted forwards. The projection 240b is consequently deflected upwards and the spectacles 224 are released.

To match the spectacle holder to different sizes of spectacles, the distance between the supports 220 and the clip 240 can be manually adjusted using the adjusting screw 260.

In this embodiment, a centering projection 270 arranged preferably on the rear wall 210 and which supports the spectacles 224 from beneath and at the same time centres them laterally could serve as an alternative to the two U-shaped supports 220.

FIGS. 20 and 21 show a spectacle holder analogous to that of FIGS. 18 and 19; in this embodiment, the support[3] 320 is arranged at the upper edge of the rear wall 310, whilst the movable clips[4] 340 are supported by way of springs 350 on the bottom wall 311.

[3] The analogous part 240 in FIGS. 18 and 19 is called a clip "Klammer".
[4] The analogous parts in FIGS. 18 and 19 are called "supports" (Aufnahmen)—translator.

Once the spectacles 324 have been inserted in the clips 340, these are pressed downwards by means of the spectacles 324 against the force of the springs 350 until the spectacles are able to pass beneath the projection 320a of the support 320 and snap in behind this.

For removal, the spectacles 324 can be pivoted forwards. As the spectacles run over the projection 320a, the clips 340 are pressed downwards against the force of the springs 350 until the spectacles are released from the projection 320a and can be removed.

In the embodiments of the spectacle supports shown in FIGS. 13 to 21, it is also possible for the spectacle sidepieces 151, 351 to be opened out and folded up with the spectacles 224, 324 inserted.

FIGS. 22 to 27 show different concepts and applications of protective housings for the spectacle holder.

Figure 22:
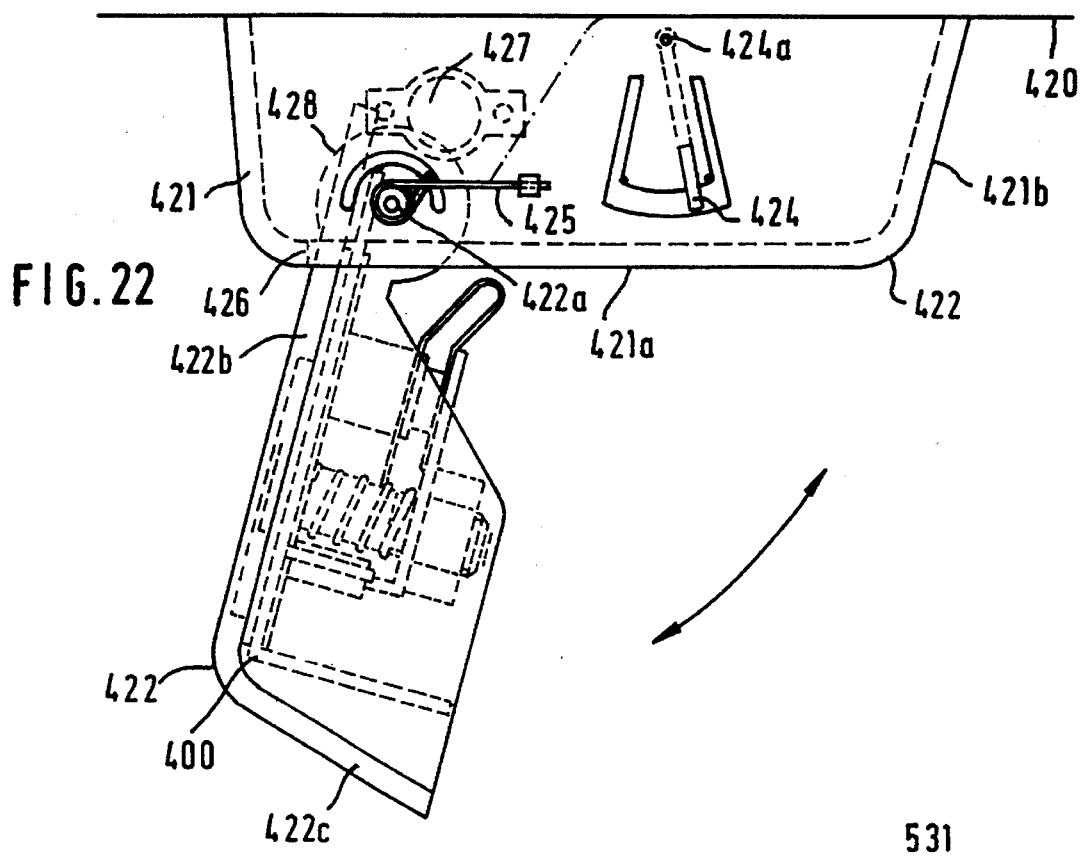
FIG. 22 is a side view of a first variant of a protective housing with a built-in spectacle holder in the outer rest position.

FIG. 22 shows a first variant of a protective housing 421, preferably located on the interior roof 420 of a vehicle, in which a closure cover 442 containing the spectacle holder 400 is mounted by way of the hinge 422a so as to rotate.

The protective housing 421 has on its underside 421a and on its end face 421b a housing opening, which is covered by complementary walls 422b, 422c of the closure cover 422 when this is closed.

By omitting the end face 421b on the protective housing 421 access to the spectacle holder 400 when the closure cover 422 is swung open is facilitated.

In its closed state, the closure cover 422 is retained in the locking mechanism 424 in the protective housing 421 against the force of the opening spring 425. The locking mechanism 424, which is pivotable about the bearing 424a, engages in a control crank (not illustrated) which is arranged on the closure cover 422 and, by pressure on the closure cover 422, changes the locking mechanism from the locked into the unlocked position, in which the closure cover 422 is released and moved under the influence of the force of the opening spring 425 towards the stop member 426 into the outer rest position.

The opening movement is damped by a damping coupling 427, in which a toothed segment 428 arranged on the closure cover 422 engages.

Figure 23:
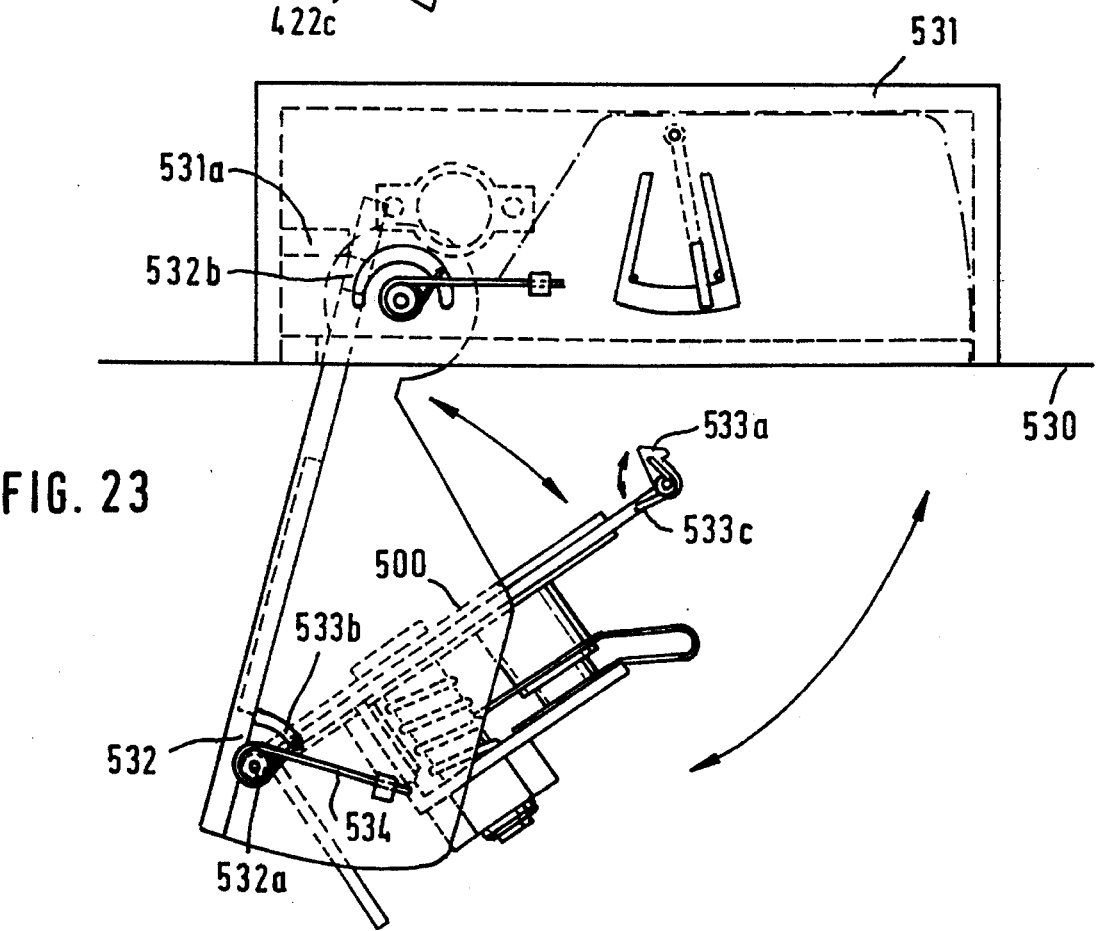
FIG. 23 is a side view of a second variant of a protective housing with a built-in spectacle holder in the outer rest position.

FIG. 23 shows an embodiment similar to that in FIG. 22.

The protective housing 531 is let into the roof panel 530 of a motor vehicle.

To guarantee trouble-free insertion and removal of a pair of spectacles, in this variant the spectacle holder 500 is connected by way of the bearing 532a to the closure cover 532 so as to rotate.

When the closure cover 532 reaches it outer rest position, the locking member 533a arranged at the upper end of the spectacle holder 500, which holds the spectacle holder 500 fixedly in the recess 532b of the closure cover 532 against the force of the pivoting spring 534, runs onto the release projection 531a arranged in the protective housing 531 and is released from the recess 532b against the force of the locking spring 533c.

Once the locking member 533a has been released, the spectacle holder 500 pivots under the influence of the force of the pivoting spring 534 into its outer position, which is limited by the stop member 533b.

When the closure cover 532 is closed, it has to be pivoted sufficiently far for the recess 532b to be pivoted out of the operating range of the release projection 531a so that the spectacle holder 500 can be locked in the closure cover 532 and this can be folded up into the protective housing 531.

As an alternative to extending the spectacle holder 500 by means of the pivoting spring 534, a mechanical controlled movement system could be provided, which extends the spectacle holder 500 from or folds it into closure cover as a function of the opening and closing movement respectively thereof.

Figure 24:
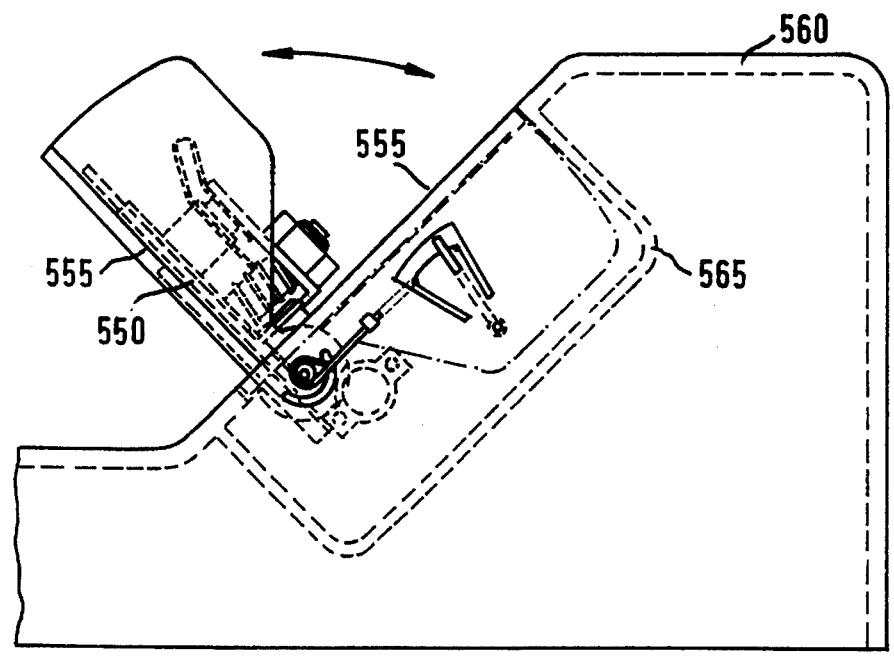
FIG. 24 is a side view of a third variant of a protective housing with a built-in spectacle holder in the outer rest position.

FIG. 24 shows an embodiment in which the spectacle holder 550 is integrated in the closure cover 555 of a protective housing 565 let into a central panel 560 arranged between the seats of the motor vehicle.

Figure 25:
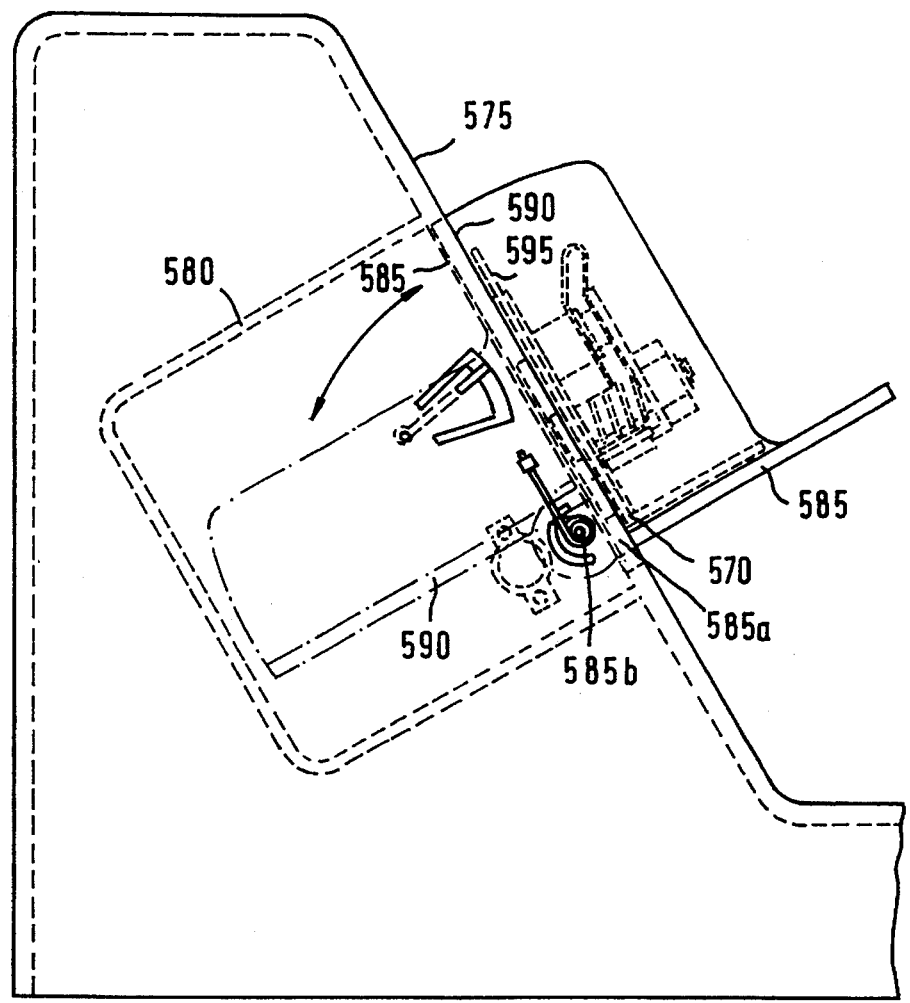
FIG. 25 is a side view of a fourth variant of a protective housing with a built-in spectacle holder in the outer rest position.

FIG. 25 shows an embodiment in which the spectacle holder 570 is integrated in a protective housing 580 let into the dashboard 575.

The carrier plate 590, on which the rear wall 595 of the carrier of the spectacle holder 570 is mounted, is formed integrally with the closure cover 585 and perpendicular thereto.

Figure 26:
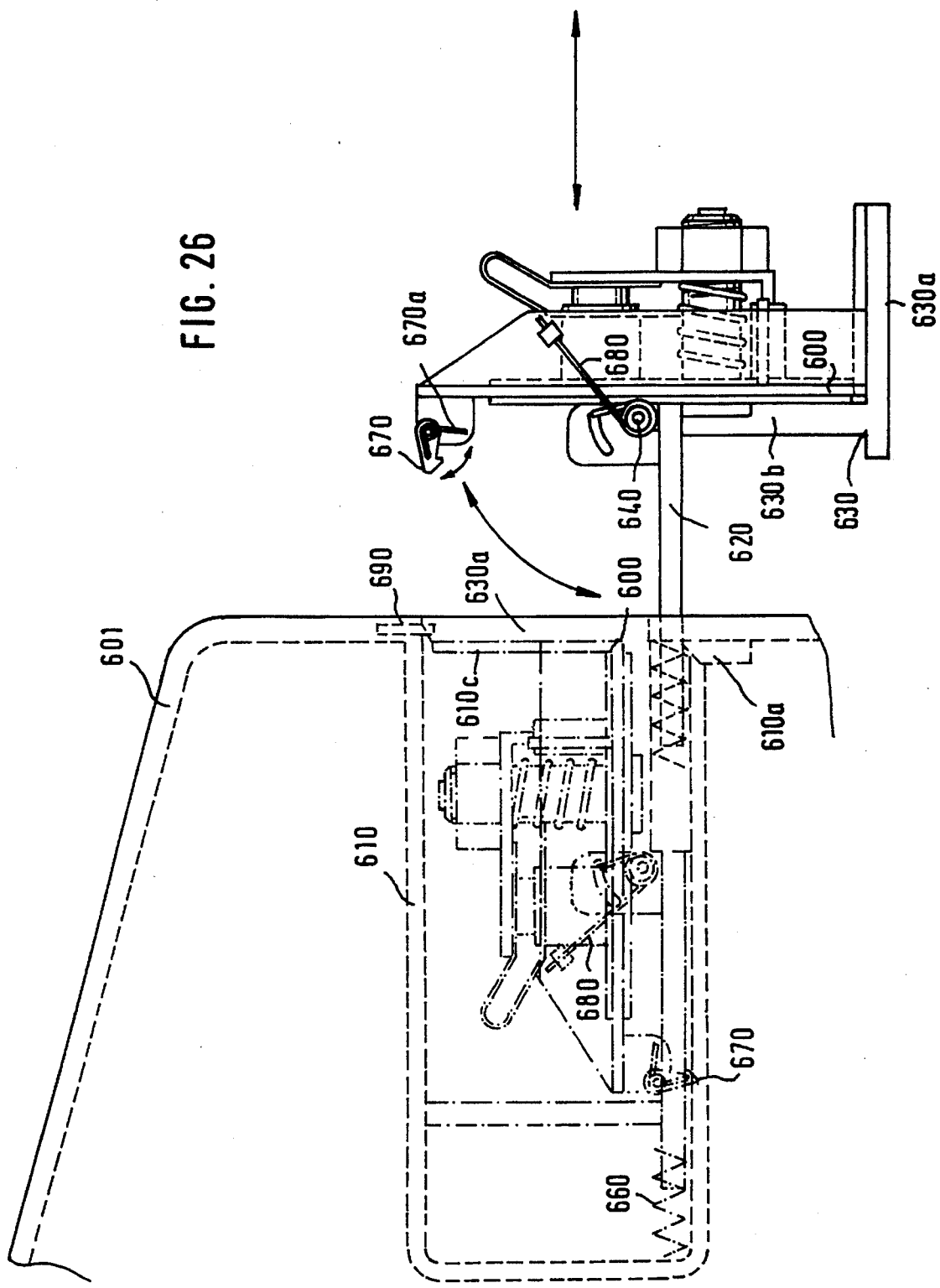
FIG. 26 is a side view of a fifth variant of a protective housing with a built-in spectacle holder in the inner and outer positions.

FIG. 26 shows an embodiment which can be installed horizontally or vertically in the dashboard or in a central panel.

The protective housing 610, in which the slider plate 620 is mounted so as to slide longitudinally, is arranged in the dashboard 600. The closure cover 630, on which the spectacle holder 600 is mounted, is rotatably mounted on the slider plate 620 by means of the hinge 640. The closure cover 630 has an L-shaped cross-section and its face 630a closes the housing opening 610c and the spectacle holder 600 is mounted on its face 630b.

With the slider plate 620 inserted, the face 630b, and consequently the spectacle holder 600, lies in a position parallel to the slider plate 620, and the front wall 630a closes the opening of the protective housing 610.

When the locking member 690 is released, the slider plate 620 is moved outwards under the influence of the force of the extension spring 660 out of the protective housing 610. As this happens, the catch 670, which holds the closure cover 630 firmly against the force of the torsion spring 680 against the slider plate 620, runs onto the stop projection 610a arranged on the protective housing 610 which deflects the catch 670 against the force of the catch spring 670a and thus releases the closure cover 630, which is set up perpendicularly to the slider plate 620 under the influence of the torsion spring 680.

For closure, the closure cover 630 is pivoted backwards until its face 630b lies parallel to the slider plate 620 and together with this is inserted against the force of the extension spring 660 into the protective housing 610 until the locking mechanism 690 on the protective housing 610 has locked.

As soon as the catch 670 has passed over the stop projection 610a as the slider plate 620 is inserted, the closure cover 630 is again locked in the slider plate 620.

As an alternative to setting the closure cover 630 upright by means of the torsion spring 680, in this embodiment a mechanical controlled movement system can likewise be provided, which pivots the closure cover 630 as a function of the opening and closing movement respectively of the slider plate 620.

Figure 27:
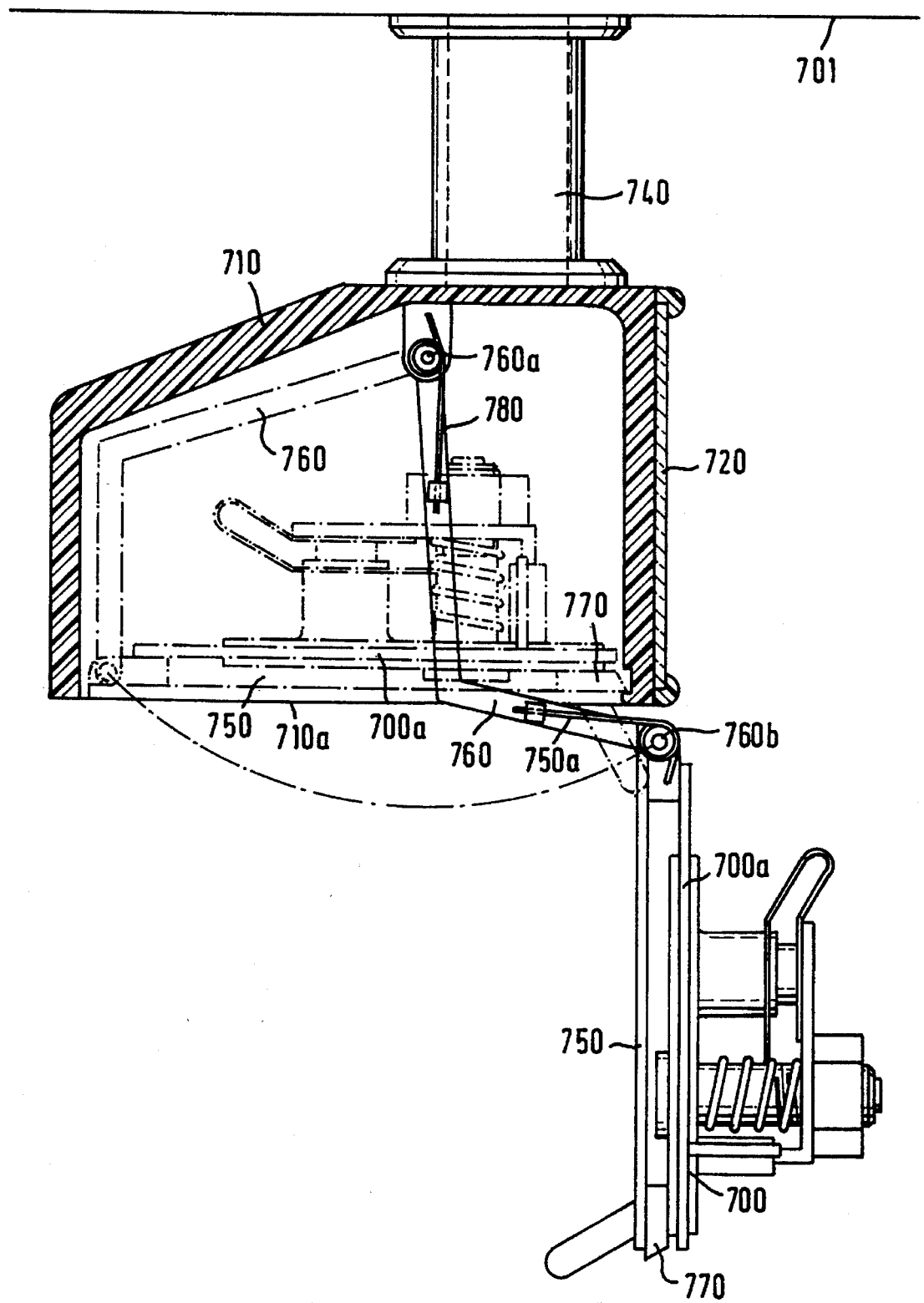
FIG. 27 shows in cross-section a protective housing arranged on an interior rear-view mirror, with the spectacle holder in the inner and outer rest positions.
Figure 31:
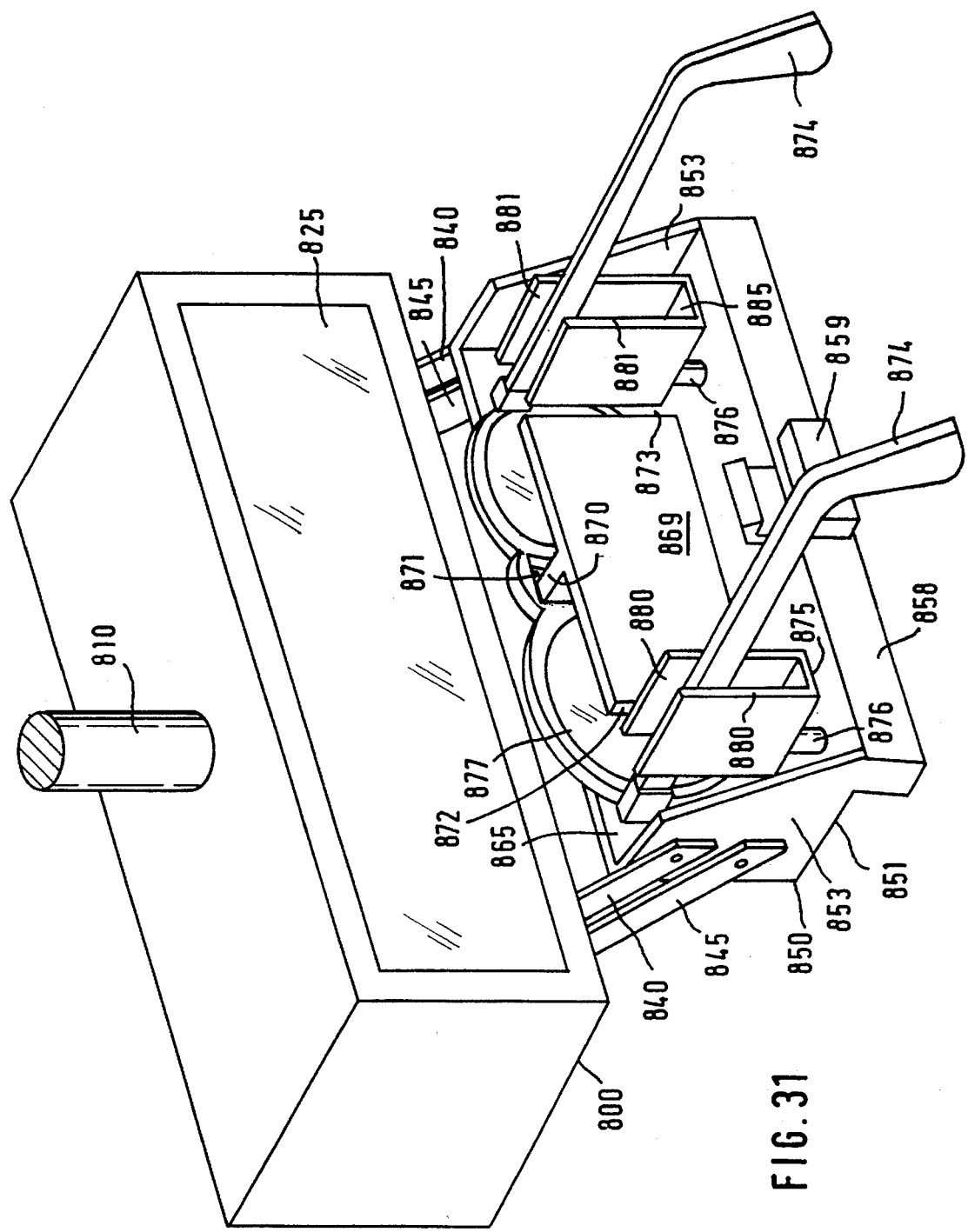
FIG. 31 is a diagrammatic perspective view of the embodiment according to FIGS. 28 to 30.

FIG. 27 shows an embodiment in which the protective housing 710 for the spectacle holder is constructed as part of an interior rear-view mirror 720 which is secured to the inner roof 701 of a motor vehicle by means of the bracket member 740.

The protective housing 710 has on its underside a housing opening 710a. The closure cover 750, on the inside of which the carrier 700a of the spectacle holder 700 is mounted, is joined by a swivel arm 760 by way of the hinges 760a, 760b to the protective housing 710 so as to swivel. When the locking mechanism 770 is released, the swivel arm 760 moves about the hinge 760a under the influence of the force of the torsion spring 780 downwards out of the housing opening 701a.

At the same time, the closure cover 750 swivels downwards out of the protective housing 710 about the hinge 760b under the influence of the force of the torsion spring 750a into the outer rest position.

The spectacle holder is thus presented in a position below and in front of the rear-view mirror, and the spectacles can be removed from the holder or inserted therein parallel to the rear-view mirror.

To close the device, the swivel arm 760 is pushed back against the force of the torsion spring 760a into the protective housing 710 and at the same time the closure cover 750 is folded in together with the spectacle holder 700 against the force of the torsion spring 750a until the inner rest position has been reached and the locking mechanism 770 is locked in the protective housing 710.

FIGS. 28 to 33 show a further embodiment of a spectacle holder having a protective housing arranged behind an interior rear-view mirror; in this embodiment an additional device is arranged on the spectacle holder for folding up and opening out the spectacle side-pieces.

In FIGS. 28 to 31, the protective housing 800 is secured by way of a bracket element 810 to the roof of the vehicle bodywork 820. A rear-view mirror 825 is integrated in the protective housing 800. The protective housing 800 has on its lower broad face 830 a housing opening 835. By means of parallel guide members 840, 845, the carrier 850 is connected to the protective housing 800 so as to perform a rotary movement. The parallel guide members 840, 845 can rotate about bearings 855, which are arranged on the side walls 857 of the protective housing 800 and on the side walls 853 of the carrier 850.

In the inner rest position, the carrier 850 is enclosed in the protective housing 800. The cover 851 on the underside of the carrier 850 then substantially masks the housing opening 835 of the protective housing 800. After manual release of the locking mechanism 859, which is arranged in the closure rail 858 of the carrier 850, the carrier 850 moves under the effect of the force of a torsion spring 861 downwards out of the protective housing 800 into its outer rest position. A damping means 862 damps this movement. To close the device, the carrier 850 is pushed at the closure rail 858 from its outer rest position back into the protective housing 800 against the force of the torsion spring 861, until the locking mechanism 859 locks in the protective housing 800.

The carrier 850 has an L-shaped cross-section which is formed by the rear wall 865 and the cover 851 and is closed on its end faces by the two side walls 853. A supporting wall 869 extends vertically upwards from the cover 851 and parallel to the rear wall 865. Together with this, it forms the spectacle holder. In the middle, the rear wall 865 and the supporting wall 869 are joined to one another by way of a centring device 870 which engages in the nose space 871 of an inserted pair of spectacles 877 and centres these in the spectacle holder. At its lateral ends 870, 871 the supporting wall 869 has openings 872, 873 for the side-pieces 874 of the spectacles, which openings extend substantially over the height of the supporting wall 869. Arranged in the region of the openings 872, 873 are arms 875, 885 which are rotatably mounted in the cover 851 by means of swivelling axles 876. The side-pieces 874 of the spectacles are inserted between the carriers 880, 881 of the arms 875, 885 as the spectacles 877 are inserted and, as the arms 875, 885 rotate about the swivelling axles 876, are opened out or folded up behind the supporting wall 869. When the spectacles 877 are removed from the holder, they are taken upwards out of the spectacle holder and at the same time the side-pieces 874 are withdrawn from the carriers 880, 881.

Figure 32:
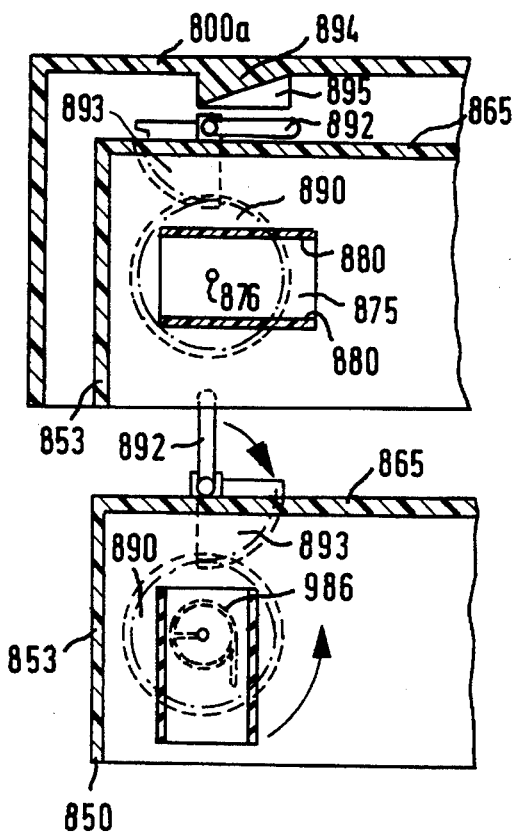
FIG. 32 is a diagrammatic longitudinal section of a detail construction of the device for opening and closing the spectacle side-pieces in the folded-up and opened-out position respectively.
Figure 33:
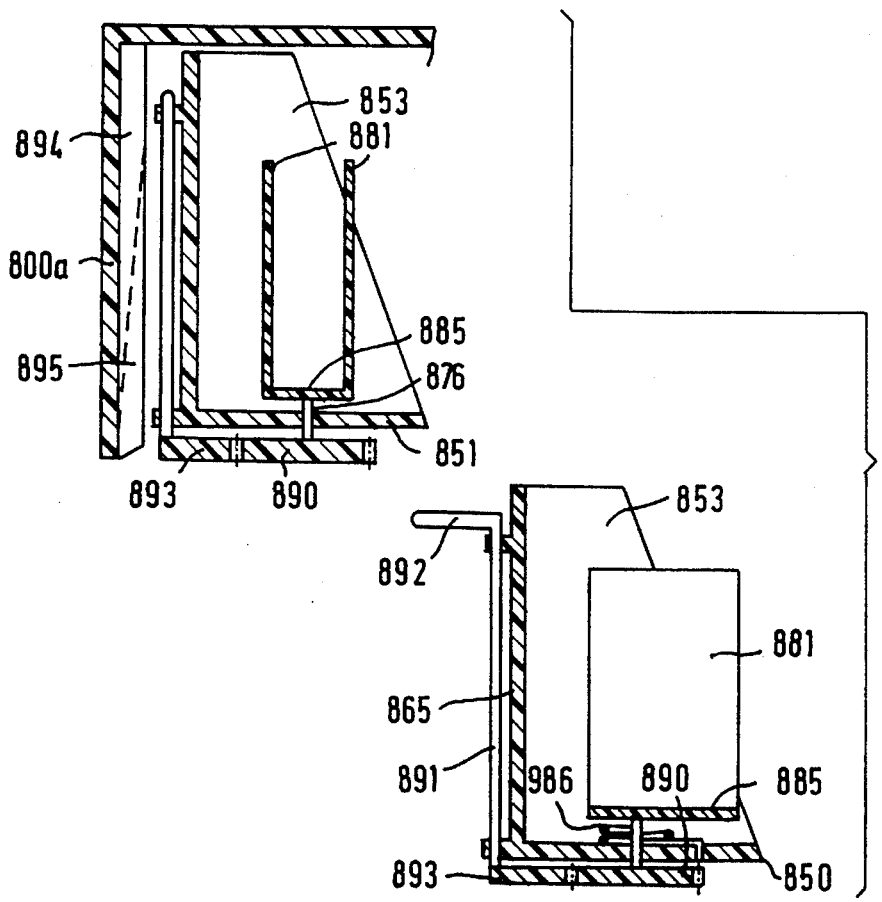
FIG. 33 is a diagrammatic cross-section of a detail construction of the device for opening and closing the spectacle side-pieces in the folded-up and opened-out position respectively.

FIGS. 32 and 33 illustrate the control of the rotary movement of the arms 875, 885 by the relative movement between the protective housing 800 and the carrier 850 as the device is opened and closed.

Beneath the cover 851, the swivelling axles 876 are connected to gearwheels 890. Mounted on the rear wall 865 of the carrier 850 there are rotary arms 891 which have at their upper ends control cams 892 and at their lower ends toothed sectors 893, which mesh with the gearwheels 890.

On the rear wall 800a of the protective housing 800 there are ribs 894 with control cams 895. Torsion springs 986 press the arms 875, 885 into a position parallel to the extending movement of the carrier 850 from the protective housing 800. As the carrier 850 is introduced into the protective housing 800, the control cams 892 meet the control cams 895, which rotate the control cams 892 through 90°. As this happens, the gearwheels 890, and consequently the arms 875, 885, are turned by way of the toothed sectors 893 against the forces of the torsion springs 896 likewise through 90° into a position parallel with the rear wall 865 of the carrier 850. This rotation is effected before the sidepieces 877 of an inserted pair of spectacles 877 can touch the protective housing 800.

The outer rest position of the carrier 850 is determined by a stop member 900, against which the force of the spring 861 presses the parallel guide member 840. The angle of rotation of the parallel guide members 840, 845 is thus fixed in such a way that the carrier 850, and with it the spectacle holder, comes to lie in its outer rest position in front of the rear-view mirror 825, so that the spectacles 877 can easily be inserted and removed.

The parallel guide members 840, 845 ensure that the spectacle holder is held in a parallel position throughout its entire swivelling movement.

It will be understood that each of the elements described above, or two or more together, may also find a useful application in other types of constructions differing from the types described above.

While the invention has been illustrated and described as embodied in a storage device for spectacles, in particular for installation in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A spectacle holder for installation in motor vehicles, comprising a carrier having a rear wall and spectacle rests; a pressure plate movably joined to said carrier and extending substantially parallel to said rear wall so that said pressure plate leaves open empty spaces on both sides for spectacle side pieces of an inserted pair of spectacles, so that the side pieces can be opened out or folded up behind said pressure plate, said pressure plate being movable relative to said rear wall so that a distance between said rear wall and said pressure plate is adjustable to a thickness of a pair of spectacles inserted therebetween; and spring means clamping the spectacles between said rear wall and said pressure plate.

2. A spectacle holder as defined in claim 1; and further comprising means for connecting said pressure plate to said carrier and including parallel guide means provided on said pressure plate and said carrier.

3. A spectacle holder as defined in claim 1; and further comprising means for connecting said pressure plate with said carrier and including a rotary hinge.

4. A spectacle holder as defined in claim 1, wherein said spring means is formed to press said pressure plate against said rear wall of said carrier.

5. A spectacle holder as defined in claim 1, wherein said spring means is formed so as to press said pressure plate away from said rear wall of said carrier.

6. A spectacle holder as defined in claim 1; and further comprising means for adjusting the distance between said rear wall of said carrier and said pressure plate and including an adjusting screw.

7. A spectacle holder as defined in claim 6, wherein said spring means and said adjusting screw are arranged so that a movement of said pressure plate is effected in one direction by a force of said spring means and in the other direction under the action of said adjusting screw.

8. A spectacle holder as defined in claim 6, wherein said adjusting screw is arranged substantially perpendicularly to said rear wall of said carrier.

9. A spectacle holder as defined in claim 6, wherein said pressure plate has a hole through which said adjusting screw projects.

10. A spectacle holder as defined in claim 6; and further comprising means for turning said adjusting screw and arranged behind said pressure plate.

11. A spectacle holder as defined in claim 6, wherein said adjusting screw is joined to said rear wall of said carrier by a thread and has a driving member for adjusting said pressure plate.

12. A spectacle holder as defined in claim 11, wherein said spring means has a spring arranged between said pressure plate and said driver.

13. A spectacle holder as defined in claim 6, wherein said adjusting screw is fixedly joined to said rear wall; and further comprising an adjusting nut which adjusts said pressure plate and is arranged behind said pressure plate.

14. A spectacle holder as defined in claim 13, wherein said spring is arranged between said pressure plate and said adjusting nut.

15. A spectacle holder as defined in claim 6, wherein said adjusting screw has a shank; and further comprising an adjusting wheel provided for turning said adjusting screw and mounted on an axle running transversely to said shank of said adjusting screw; and means for transferring rotation to said adjusting screw from said adjusting wheel and including a gear mechanism with bevel wheels.

16. A spectacle holder as defined in claim 6; and further comprising a friction brake arranged to adjust a distance between said rear wall and said pressure plate.

17. A spectacle holder as defined in claim 16; and further comprising a push button arranged behind said pressure plate and releasing said friction brake so as to adjust said pressure plate.

18. A spectacle holder as defined in claim 1; and further comprising a stop member arranged to limit an opening travel of said pressure plate.

19. A spectacle holder as defined in claim 6; and further comprising means for securing said pressure plate against rotation.

20. A spectacle holder as defined in claim 1, wherein said pressure plate is composed of a resilient material.

21. A spectacle holder as defined in claim 1; and further comprising a centering means engaging in a nose space of an inserted pair of spectacles and centering the same laterally, said centering means being arranged between said rear wall and said pressure plate.

22. A spectacle holder as defined in claim 21, wherein said centering means includes a first centering part arranged on said rear wall and a second centering part arranged on said pressure plate and telescopically engaging one another.

23. A spectacle holder as defined in claim 21, wherein said pressure plate extends beyond said centering means.

24. A spectacle holder as defined in claim 1; and further comprising an angled guide member arranged at an upper end of said pressure plate in a mounted condition and sloping away from said rear wall of said carrier.

25. A spectacle holder as defined in claim 1, wherein said spring means include a spring plate arranged between said rear wall and said pressure plate.

26. A spectacle holder as defined in claim 1, wherein said spectacle rests are arranged on said rear wall of said carrier.

27. A spectacle holder as defined in claim 26, wherein said spectacles rests are arranged so that there is a free space between said spectacle rests and said pressure plate is arranged in said free space.

28. A spectacle holder as defined in claim 1, wherein said rear wall has outer end edges, said spectacle rests taper toward said outer end edges.

29. A spectacle holder as defined in claim 1, wherein said carrier is L-shaped and has a bottom wall arranged below said spectacle rests and extending beyond their depth.

30. A spectacle holder as defined in claim 21; and further comprising means for adjusting a distance between said spectacle rests and said centering means.

31. A spectacle holder as defined in claim 30, wherein said adjusting means includes a slider which is slidably mounted in said rear wall and carries said centering means.

32. A spectacle holder as defined in claim 31, wherein said pressure plate is arranged in said slider.

33. A spectacle holder as defined in claim 31; and further comprising a manually releasable friction plate biased by a spring and fixing said slider.

34. A spectacle holder as defined in claim 1; and further comprising a protective housing, said carrier being movably joined to said protective housing and is movable between an inner rest position in which the spectacle holder is enclosed in the protective housing and an outer rest position in which the spectacles can easily be inserted in the spectacle holder and removed therefrom.

35. A spectacle holder as defined in claim 34, wherein said protective housing has a housing opening through which a spectacle holder moves from one rest position into the other.

36. A spectacle holder as defined in claim 35, wherein said carrier has a closure cover which closes said housing opening in said inner rest position.

37. A spectacle holder as defined in claim 36, wherein said rear wall of said carrier lies substantially parallel to a main plane of said closure cover.

38. A spectacle holder as defined in claim 36, wherein said rear wall of said carrier lies substantially perpendicularly to a main plane of said closure cover.

39. A spectacle holder as defined in claim 36, wherein said carrier is rotatably mounted in said closure cover.

40. A spectacle holder as defined in claim 34; and further comprising a connecting member which joins said carrier to said protective housing.

41. A spectacle holder as defined in claim 34; and further comprising means for locking said carrier in said protective housing and releasing said carrier manually.

42. A spectacle holder as defined in claim 36; and further comprising means for arranging said protective housing on an interior roof of a motor vehicle so that said closure cover is swingable open downwards.

43. A spectacle holder as defined in claim 42, wherein said protective housing has an end face which is open, said closure cover being provided with a complementary wall which closes said open end face when said closure cover is closed.

44. A spectacle holder as defined in claim 36; and further comprising means for rotatably hinge-mounting said closure cover on said protective housing; and a stop member which limits an opening angle to about 90°.

45. A spectacle holder as defined in claim 44, wherein said carrier plate is formed integrally with said closure cover perpendicular thereto, said closure cover being mounted in said protective housing to rotate about an axle arranged in a region of a common edge.

46. A spectacle holder as defined in claim 36; and further comprising a slider plate mounted so as to slide longitudinally in said protective housing, said closure cover being rotatably hinge-mounted at an outer end of said slider plate.

47. A spectacle holder as defined in claim 34; and further comprising means for connecting said protective housing to an interior rear-view mirror so that said protective housing forms a part of the mirror and is arranged behind the latter, said protective housing having a lower housing opening, said carrier being mounted by a connecting part in said protective housing so that in its outer rest position said carrier lies beneath the interior rear-view mirror.

48. A spectacle holder as defined in claim 34; and further comprising a device for opening and closing the spectacle side pieces, said device being actuatable by a relative movement between said protective housing and said carrier.

49. A spectacle holder for installation in motor vehicles, comprising a carrier; a support for supporting a narrow side of a pair of spectacles; a clip engaging over an opposite narrow side of the spectacles, said support and said clip being arranged to be moved sufficiently far away from one another so that the spectacles can be inserted therebetween; and means for manual adjustment of a distance between said support and said clip.

50. A spectacle holder for installation in motor vehicles, comprising a carrier; a support for supporting a narrow side of a pair of spectacles; and a clip engaging over an opposite narrow side of the spectacles, said support and said clip being arranged to be moved sufficiently far away from one another so that the spectacles can be inserted therebetween; said support being formed as a centering projection which projects into a nose space of an inserted pair of spectacles.

51. A spectacle holder for installation in motor vehicles, comprising a carrier; a support for supporting a narrow side of a pair of spectacles; a clip engaging over an opposite narrow side of the spectacles, said support and said clip being arranged to be moved sufficiently far away from one another so that the spectacles can be inserted therebetween; and angles guide members provided on said clip and on said support so that they are pressed apart as the spectacles are inserted in and removed from the holder.

52. A spectacle holder for installation in motor vehicles, comprising a carrier; a support for supporting a narrow side of a pair of spectacles; and a clip engaging over an opposite narrow side of the spectacles, said support and said clip being arranged to be moved sufficiently far away from one another so that the spectacles can be inserted therebetween, said carrier being formed as an L-shaped element with a rear wall and a bottom wall, said support and said clip being arranged so that the spectacles lie with their broad face parallel to said rear wall.

53. A spectacle holder as defined in claim 52, wherein said rear wall of said carrier has separate components in the region of lenses of a pair of spectacles inserted in the holder.

54. A spectacle holder as defined in claim 53, wherein said components are releasably attached to said rear wall.

55. A spectacle holder as defined in claim 53, wherein said components have end faces directed toward the spectacle lenses and provided with caps having a textile covering.

56. A spectacle holder for installation in motor vehicles, comprising a carrier; a support for supporting a narrow side of a pair of spectacles; and a clip engaging over an opposite narrow side of the spectacles, said support and said clip being arranged to be moved sufficiently far away from one another so that the spectacles can be inserted therebetween, said support and said clip being arranged so that there is a free space therebetween so that side pieces of a pair of spectacles inserted in the hole can be opened out or folded up.

57. A spectacle holder for installation in motor vehicles, comprising a carrier; a support for supporting a narrow side of a pair of spectacles; a clip engaging over an opposite narrow side of the spectacles, said support and said clip being arranged to be moved sufficiently far away from one another so that the spectacles can be inserted therebetween; a protective housing, said carrier being movably joined to said protective housing and is movable between an inner rest position in which the spectacle holder is enclosed in the protective housing and an outer rest position in which the spectacles can easily be inserted in the spectacle holder and removed therefrom.

58. A spectacle holder as defined in claim 57, wherein said protective housing has a housing opening through which a spectacle holder moves from one rest position into the other.

59. A spectacle holder as defined in claim 58, wherein said carrier has a closure cover which closes said housing opening in said inner rest position.

60. A spectacle holder as defined in claim 59, wherein said rear wall of said carrier lies substantially parallel to a main plane of said closure cover.

61. A spectacle holder as defined in claim 59, wherein said rear wall of said carrier lies substantially perpendicularly to a main plane of said closure cover.

62. A spectacle holder as defined in claim 59, wherein said carrier is rotatably mounted in said closure cover.

63. A spectacle holder as defined in claim 57; and further comprising a connecting member which joins said carrier to said protective housing.

64. A spectacle holder as defined in claim 57; and further comprising spring means moving said carrier from said inner to said outer rest position.

65. A spectacle holder as defined in claim 57; and further comprising means for locking said carrier in said protective housing and releasing said carrier manually.

66. A spectacle holder as defined in claim 59; and further comprising means for arranging said protective housing on an interior roof of a motor vehicle so that said closure cover is swingable open downwards.

67. A spectacle holder as defined in claim 66, wherein said protective housing has an end face which is open, said closure cover being provided with a complementary wall which closes said open end face when said closure cover is closed.

68. A spectacle holder as defined in claim 59; and further comprising means for rotatably hinge-mounting said closure cover on said protective housing; and a stop member which limits an opening angle to about 90°.

69. A spectacle holder as defined in claim 68, wherein said carrier plate is formed integrally with said closure cover perpendicular thereto, said closure cover being mounted in said protective housing to rotate about an axle arranged in a region of a common edge.

70. A spectacle holder as defined in claim 59; and further comprising a slider plate mounted so as to slide longitudinally in said protective housing, said closure cover being rotatably hinge-mounted at an outer end of said slider plate.

71. A spectacle holder as defined in claim 57; and further comprising means for connecting said protective housing to an interior rear-view mirror so that said protective housing forms a part of the mirror and is arranged behind the latter, said protective housing having a lower housing opening, said carrier being mounted by a connecting part in said protective housing so that in its outer rest position said carrier lies beneath the interior rear-view mirror.

72. A spectacle holder as defined in claim 59; and further comprising a device for opening and closing the spectacle side pieces, said device being actuatable by a relative movement between said protective housing and said carrier.

73. A spectacle holder as defined in claim 57; and further comprising spring means moving said carrier from said inner to said outer rest position.

* * * * *